(12) United States Patent
Hu et al.

(10) Patent No.: US 12,493,736 B2
(45) Date of Patent: Dec. 9, 2025

(54) METHOD AND DEVICE FOR PROCESSING DOCUMENT AND METHOD AND DEVICE FOR PROCESSING PAGE

(71) Applicant: Dingtalk Holding (Cayman) Limited, Grand Cayman (KY)

(72) Inventors: Yiyu Hu, Zhejiang (CN); Renquan Wang, Zhejiang (CN)

(73) Assignee: Dingtalk Holding (Cayman) Limited, Grand Cayman (KY)

( * ) Notice: Subject to any disclaimer, the term of this patent is extended or adjusted under 35 U.S.C. 154(b) by 779 days.

(21) Appl. No.: 17/798,043

(22) PCT Filed: Feb. 4, 2021

(86) PCT No.: PCT/CN2021/075228
§ 371 (c)(1),
(2) Date: Nov. 22, 2022

(87) PCT Pub. No.: WO2021/155820
PCT Pub. Date: Aug. 12, 2021

(65) Prior Publication Data
US 2023/0115459 A1    Apr. 13, 2023

(30) Foreign Application Priority Data

Feb. 8, 2020  (CN) .......................... 202010085538.2

(51) Int. Cl.
*G06F 17/00*       (2019.01)
*G06F 3/0483*     (2013.01)
(Continued)

(52) U.S. Cl.
CPC .......... *G06F 40/169* (2020.01); *G06F 3/0483* (2013.01); *G06F 3/04883* (2013.01);
(Continued)

(58) Field of Classification Search
CPC .. G06F 40/169; G06F 3/0483; G06F 3/04883; G06T 11/203; G06T 11/60; H04L 51/046; H04L 51/18
See application file for complete search history.

(56) References Cited

U.S. PATENT DOCUMENTS 6,289,140 B1 * 9/2001 Oliver ..................... G10L 15/30
704/275
9,256,588 B1 * 2/2016 Moscovich ........... G06F 40/171
(Continued)

FOREIGN PATENT DOCUMENTS

CN        1658137 A       8/2005
CN      101206640 A       6/2008
(Continued)

OTHER PUBLICATIONS

English translation of the International Search Report and Written Opinion by the International Searching Authority for PCT Application No. PCT/CN2021/075228, Apr. 23, 2021, 7 pages.

*Primary Examiner* — Mohammed H Zuberi
(74) *Attorney, Agent, or Firm* — Foley & Lardner LLP

(57) ABSTRACT

Method and device for processing document and method and device for processing page. The method may comprise: displaying a target document on a display interface (101); detecting an operation, which is executed by a user on the display interface, for drawing a specific shape, and obtaining a target area corresponding to the specific shape (102); obtaining an annotation content entered by the user for target content corresponding to the target area (103); and updating and displaying the target document based on an association relationship between the target content and the annotation content, so that the target document displayed on the display interface includes the annotation content associated with the target content (104). Therefore, the document annotation efficiency is improved.

18 Claims, 24 Drawing Sheets

(51) Int. Cl.
*G06F 3/04883* (2022.01)
*G06F 40/169* (2020.01)
*G06T 11/20* (2006.01)
*G06T 11/60* (2006.01)
*H04L 51/046* (2022.01)
*H04L 51/18* (2022.01)

(52) U.S. Cl.
CPC ............ *G06T 11/203* (2013.01); *G06T 11/60*
(2013.01); *H04L 51/046* (2013.01); ***H04L
51/18*** (2013.01)

(56) References Cited

U.S. PATENT DOCUMENTS

| | | | | |
|---|---|---|---|---|
| 9,684,645 | B2* | 6/2017 | Beavers | ................ G06F 40/169 |
| 9,899,038 | B2* | 2/2018 | Khaleghi | ................ G16H 50/20 |
| 9,927,963 | B2* | 3/2018 | Wilson | ................ G06F 3/0483 |
| 10,235,998 | B1* | 3/2019 | Khaleghi | ............ G10L 15/1815 |
| 10,296,170 | B2* | 5/2019 | Kurita | .................. G06V 30/347 |
| 10,684,772 | B2* | 6/2020 | Murakawa | .......... G06F 3/04883 |
| 11,115,695 | B2* | 9/2021 | Lewis | ..................... H04L 67/10 |
| 11,455,460 | B2* | 9/2022 | Tao | ....................... G06V 30/333 |
| 11,893,048 | B1* | 2/2024 | Penfield | ................ G06V 30/412 |
| 12,314,655 | B2* | 5/2025 | Zhang | .................. G06F 40/106 |
| 2002/0078088 | A1 | 6/2002 | Kuruoglu et al. | |
| 2002/0111966 | A1 | 8/2002 | Fukuda et al. | |
| 2011/0175855 | A1* | 7/2011 | Youn | .................... G06F 3/03545 |
| | | | | 715/863 |
| 2014/0006921 | A1* | 1/2014 | Gopinath | ............... G06Q 10/10 |
| | | | | 715/230 |
| 2014/0237540 | A1* | 8/2014 | King | ...................... G06F 21/10 |
| | | | | 726/1 |
| 2018/0204065 | A1* | 7/2018 | Pavetic | .................. G06V 10/764 |
| 2018/0247156 | A1* | 8/2018 | Holtham | ................. G06F 18/22 |
| 2019/0026258 | A1* | 1/2019 | Sood | ........................ G06F 16/23 |
| 2019/0392363 | A1* | 12/2019 | Kohli | ..................... G06Q 50/04 |
| 2021/0073324 | A1* | 3/2021 | Gupta | ................... G06F 40/169 |
| 2023/0115459 | A1* | 4/2023 | Hu | ...................... G06F 3/04883 |
| | | | | 715/230 |
| 2024/0111396 | A1* | 4/2024 | Vandivere | ............... G06F 40/30 |
| 2025/0103874 | A1* | 3/2025 | Kurdelski | ............. G06F 40/117 |

FOREIGN PATENT DOCUMENTS

| | | |
|---|---|---|
| CN | 104462039 A | 3/2015 |
| CN | 105379238 A | 3/2016 |
| CN | 10563608 A | 6/2016 |
| CN | 105630952 A | 6/2016 |
| EP | 1 101 168 A1 | 5/2001 |

* cited by examiner the overall feeling is that our update is not as fast as the No. 2 personnel department, and the overall function is not as complete as the No. 2 personnel department.

601 the overall feeling is that our update is
not as fast as the No. 2 personnel depart-
ment, and the overall function is not as
complete as the No. 2 personnel department.

From an individual perspective, a product experience map is not applicable to every business. The greatest significance of the experience map is scenes and stories, which can be complemented with data. For example, clocking-in is a very scene-oriented business. Through the experience map, many problems can be found. However, there are many different scenes in logs, so experience maps will be completely different...To be honest, it is also difficult to make something that satisfies the public from the perspective of scenes.

Siva
Very good thinking about the experience map. In a case where key data is missing, on the one hand, core data needs to be improved, and on the other hand, frequent scenes can be targeted (such as writing daily newspapers or visiting records...

Reply 2  Reply

Fig.9

METHOD AND DEVICE FOR PROCESSING DOCUMENT AND METHOD AND DEVICE FOR PROCESSING PAGE

CROSS-REFERENCE TO RELATED APPLICATIONS

This application is a national stage of PCT application No. PCT/CN2021/075228, which patent application claims the priority of Chinese Patent Application No. 202010085538.2, entitled "Method and Device for Processing Document and Method and Device for Processing Page" filed on Feb. 8, 2020, the entire content of which is incorporated by reference herein.

TECHNICAL FIELD

The present disclosure relates to the field of computer technology, in particular to a method and device for processing document and a method and device for processing page.

BACKGROUND

With the rapid development of the Internet, the application of online documents is becoming more and more extensive. Generally, an online document is a web page with characters and layouts, and a user can view the online document by opening a link of the online document through a document reader such as a browser, a reading plug-in or the like. The link corresponding to the online document may be forwarded to other users through the Internet, and the other users may perform operations such as online viewing, revising or commenting on the document. The more common online documents may include logs, announcements, office documents, contract documents, etc.

In background technology, a user viewing an online document may annotate the document. Usually, the user, when annotating the online document, may select the content that needs to be annotated using a cursor and input corresponding text comments for the selected content to complete the online annotation.

However, in a case where the cursor is used for text selection, the user is needed to accurately select text in the online document, so that the selection is not efficient, resulting in a relatively slow generation speed of annotations in the online document.

SUMMARY

In view of this, the embodiments of the present disclosure provide a method and device for processing document and a method and device for processing page, which are used to solve the technical problem of low annotation efficiency caused by the difficulty of using a cursor to select document content in the background technology.

In a first aspect, an embodiment of the present disclosure provides a method for processing document, including: displaying a target document on a display interface; detecting a drawing operation of a specific shape performed by a user on the display interface to obtain a target area corresponding to the specific shape; obtaining an annotation content input by the user for a target content corresponding to the target area; and updating and displaying the target document based on an association relationship between the target content and the annotation content so that the target document displayed on the display interface includes the annotation content associated with the target content.

In a second aspect, an embodiment of the present disclosure provides a method for processing document, including: determining a target area corresponding to a specific shape obtained in a case where a user performs a drawing operation of the specific shape on a display interface for displaying a target document; determining an annotation content input by the user for a target content corresponding to the target area; and updating and storing the target document based on an association relationship between the target content and the annotation content so that the target document includes the annotation content associated with the target content.

In a third aspect, an embodiment of the present disclosure provides a method for processing document, including: displaying a target document on a first display interface of a first user terminal; detecting a drawing operation of a specific shape performed by a first user on the first display interface to obtain a first target area corresponding to the specific shape; obtaining a first annotation content input by the first user for a first target content corresponding to the first target area; obtaining a second annotation content input by a second user for a second target content corresponding to a second target area, wherein the second target area is obtained by detecting, by a second user terminal, a drawing operation of a specific shape performed by the second user for the target document displayed on a second display interface; and updating and displaying the target document based on an association relationship between the first target content and the first annotation content as well as an association relationship between the second target content and the second annotation content so that the target document displayed on the first display interface includes the first annotation content associated with the first target content and the second annotation content associated with the second target content.

In a fourth aspect, an embodiment of the present disclosure provides a method for processing page, including: displaying an instant messaging page on a display interface, wherein the instant messaging page includes at least one communication message; detecting a drawing operation of a specific shape performed by a user on the display interface to obtain a target area corresponding to the specific shape; obtaining a message processing operation performed by the user for a target communication message corresponding to the target area; and performing the message processing operation on the target communication message based on an association relationship between the target communication message and the message processing operation.

In a fifth aspect, an embodiment of the present disclosure provides a method for processing page, including: obtaining a target communication message of any user terminal and a message processing operation corresponding to the target communication message, wherein the target communication message is a communication message corresponding to a target area obtained by detecting a drawing operation of a specific shape performed by a user on a display interface in a case where the user terminal displays, on the display interface, an instant messaging page including at least one communication message; the message processing operation corresponding to the target communication message, which is performed by the user for the target communication message corresponding to the target area, is detected by the user terminal and is sent to a server terminal; and performing the message processing operation on the target communication message based on an association relationship between the target communication message and an annotation content corresponding to the target communication message.

In a sixth aspect, an embodiment of the present disclosure provides a method for processing page, including: displaying an instant messaging page on a first display interface of a first user terminal, wherein the instant messaging page includes at least one communication message; detecting a drawing operation of a specific shape performed by a first user on the display interface to obtain a first target area corresponding to the specific shape; obtaining a first annotation content input by the first user for a first communication message corresponding to the first target area; obtaining a second annotation content input by a second user for a second communication message corresponding to a second target area, wherein the second target area is obtained by detecting, by a second user terminal, a drawing operation of a specific shape performed by the second user for the instant messaging page displayed on a second display interface; and updating and displaying the instant messaging page based on an association relationship between the first communication message and the first annotation content as well as an association relationship between the second communication message and the second annotation content so as to display, on the instant messaging page, the first annotation content corresponding to the first communication message and the second annotation content corresponding to the second communication message.

In a seventh aspect, an embodiment of the present disclosure provides a device for processing document, including: a storage component and a processing component, wherein the storage component is configured to store one or multiple computer instructions used to be called by the processing component; and the processing component is configured to: display a target document on a display interface; detect a drawing operation of a specific shape performed by a user on the display interface to obtain a target area corresponding to the specific shape; obtain an annotation content input by the user for a target content corresponding to the target area; and update and display the target document based on an association relationship between the target content and the annotation content so that the target document displayed on the display interface includes the annotation content associated with the target content.

In an eighth aspect, an embodiment of the present disclosure provides a device for processing a document, including: a storage component and a processing component, wherein the storage component is configured to store one or multiple computer instructions used to be called by the processing component; and the processing component is configured to: determine a target area corresponding to a specific shape obtained in a case where a user performs a drawing operation of the specific shape on a display interface for displaying a target document; determine an annotation content input by the user for a target content corresponding to the target area; and update and store the target document based on an association relationship between the target content and the annotation content so that the target document includes the annotation content associated with the target content.

In a ninth aspect, an embodiment of the present disclosure provides a device for processing document, including: a storage component and a processing component, wherein the storage component is configured to store one or multiple computer instructions used to be called by the processing component; and the processing component is configured to: display a target document on a first display interface of a first user terminal; detect a drawing operation of a specific shape performed by a first user on the first display interface to obtain a first target area corresponding to the specific shape; obtain a first annotation content input by the first user for a first target content corresponding to the first target area; obtain a second annotation content input by a second user for a second target content corresponding to a second target area, wherein the second target area is obtained by detecting, by a second user terminal, a drawing operation of a specific shape performed by the second user for the target document displayed on a second display interface; and update and display the target document based on an association relationship between the first target content and the first annotation content as well as an association relationship between the second target content and the second annotation content so that the target document displayed on the first display interface comprises the first annotation content associated with the first target content and the second annotation content associated with the second target content.

In a tenth aspect, an embodiment of the present disclosure provides a device for processing document, including: a storage component and a processing component, wherein the storage component is configured to store one or multiple computer instructions used to be called by the processing component; and the processing component is configured to: display an instant messaging page on a display interface, wherein the instant messaging page includes at least one communication message; detect a drawing operation of a specific shape performed by a user on the display interface to obtain a target area corresponding to the specific shape; obtain a message processing operation performed by the user for a target communication message corresponding to the target area; and performing the message processing operation on the target communication message based on an association relationship between the target communication message and the message processing operation.

In an eleventh aspect, an embodiment of the present disclosure provides a device for processing a document, including: a storage component and a processing component, wherein the storage component is configured to store one or multiple computer instructions used to be called by the processing component; and the processing component is configured to: obtain a target communication message of any user terminal and a message processing operation corresponding to the target communication message, wherein the target communication message is a communication message corresponding to a target area obtained by detecting a drawing operation of a specific shape performed by a user on a display interface in a case where the user terminal displays, on the display interface, an instant messaging page including at least one communication message; and the message processing operation corresponding to the target communication message, which is performed by the user for the target communication message corresponding to the target area, is detected by the user terminal and is sent to a server terminal; and performing the message processing operation on the target communication message based on an association relationship between the target communication message and annotation content corresponding to the target communication message.

In a twelfth aspect, an embodiment of the present disclosure provides a device for processing a document, including: a storage component and a processing component, wherein the storage component is configured to store one or multiple computer instructions used to be called by the processing component; and the processing component is configured to: display an instant messaging page on a first display interface of a first user terminal, wherein the instant messaging page includes at least one communication message; detect a drawing operation of a specific shape performed by a first user on the display interface to obtain a first target area corresponding to the specific shape; obtain a first annotation content input by the first user for a first communication message corresponding to the first target area; obtain a second annotation content input by a second user for a second communication message corresponding to a second target area, wherein the second target area is obtained by detecting, by a second user terminal, a drawing operation of a specific shape performed by the second user for the instant messaging page displayed on a second display interface; and update and display the instant messaging page based on an association relationship between the first communication message and the first annotation content as well as an association relationship between the second communication message and the second annotation content so as to display, on the instant messaging page, the first annotation content corresponding to the first communication message and the second annotation content corresponding to the second communication message.

In the embodiments of the present disclosure, after the target document is displayed on the display interface, the drawing operation of the specific shape performed by the user on the display interface may be detected to obtain the target area corresponding to the specific shape. After the annotation content input by the user for the target content corresponding to the target area is obtained, the target document may be updated based on the association relationship between the target content and the annotation content so that the target document includes the annotation content associated with the target content. The user may rotate the target content in the target document by drawing the specific shape on the display interface. This operation mode is relatively simple, and a cursor is not needed to select words that need to be selected one by one, which simplifies the selection operation of the target content and improves its selection efficiency, thereby improving the document annotation efficiency.

BRIEF DESCRIPTION OF THE DRAWINGS

To more clearly describe the embodiments of the present disclosure or the technical solutions in the background technology, the following description will briefly introduce the drawings that need to be used in the description of the embodiments or the background technology. Apparently, the drawings in the following description are some embodiments of the present disclosure. A person having ordinary skill in the art may also obtain other drawings according to these drawings without any creative effort.

FIG. 6b is a schematic diagram of selection of target content provided by an embodiment of the present disclosure;

FIG. 9 is a schematic diagram of associated display of a target content and an annotation content provided by the embodiments of the present disclosure;

DETAILED DESCRIPTION

Figure 1:
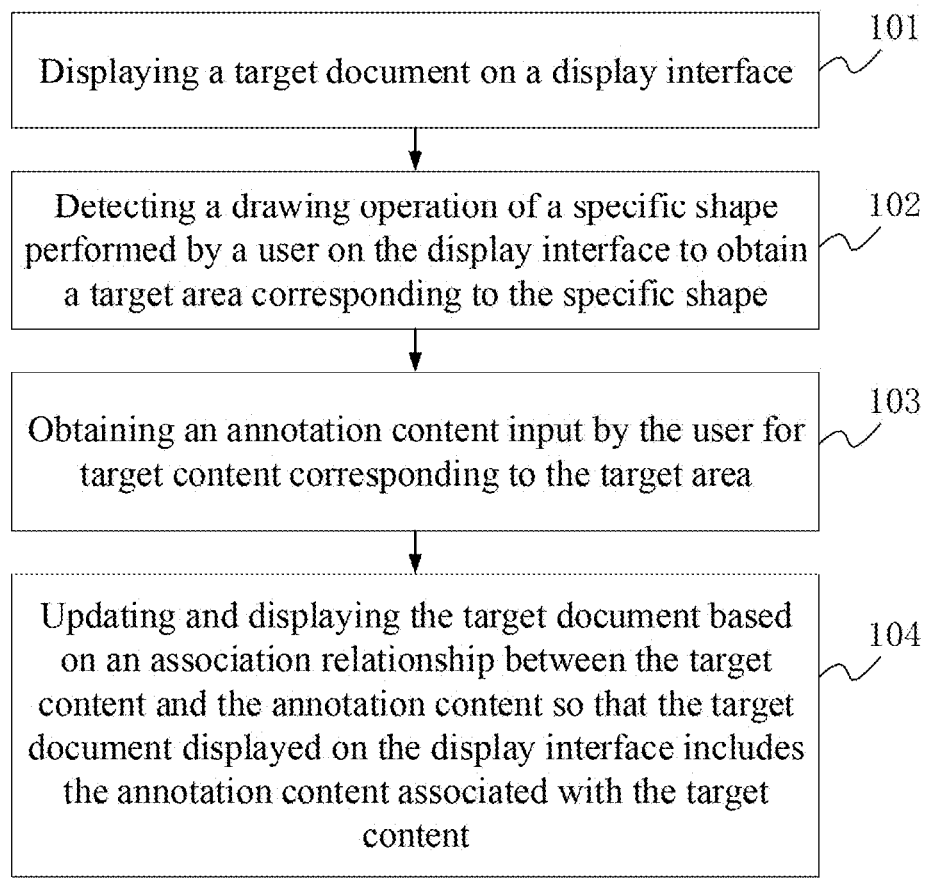
FIG. 1 is a flowchart of an embodiment of a method for processing document provided by the embodiments of the present disclosure.

In order to make the objectives, technical solutions and advantages of the embodiments of the present disclosure clearer, the technical solutions in the embodiments of the present disclosure will be described clearly and completely below with reference to the drawings in the embodiments of the present disclosure. Apparently, the described embodiments are a part, but not all of the embodiments of the present disclosure. Based on the embodiments in the present disclosure, all other embodiments obtained by a person having ordinary skill in the art without creative efforts shall fall within the scope of protection of the present disclosure.

The terms used in the embodiments of the present disclosure are only intended to describe specific embodiments, rather than limiting the present disclosure. As used in the embodiments of the present disclosure and the appended claims, "a", "said", and "the" in singular forms are intended to include plural forms as well. Unless the context clearly indicates otherwise, "a plurality of" generally includes at least two, but the case of including at least one is not excluded.

It should be understood that the term "and/or" used herein is only an association relationship to describe associated objects, and it indicates that there may be three kinds of relationships, for example, A and/or B, which may indicate that: A exists alone, A and B exist simultaneously, and B exists alone. In addition, the character "/" herein generally indicates that associated objects before and after the character have an "or" relationship.

Depending on the context, the words "if" or "in a case where" as used herein may be construed as "at . . . ", "when . . . ", "in response to determining" or "in response to recognizing". Similarly, depending on the context, the phrase "if determining" or "if recognizing (stated conditions or events)" may be construed as "when determining", "in response to determining", "when recognizing (stated conditions or events)" or "in response to recognizing (stated conditions or events)".

It should also be noted that the term "include", "comprise" or any other variation thereof is intended to cover a non-exclusive inclusion, so that a commodity or system including a series of elements includes not only those elements, but other elements that are not explicitly listed, or also includes its inherent elements. Without further limitation, an element limited by the statement "includes a . . . " does not preclude the presence of additional identical elements in the commodity or system including the element.

The embodiments of the present disclosure may be applied to document annotation. By providing a user with a shape drawing function on a display interface, the user may, using the drawing function of the interface, draw a specific shape on the display interface to conveniently select document content, so as to quickly annotate the document content and improve the efficiency of the document annotation.

In the background technology, when viewing an online document, a user may annotate the document. Typically, the user may select the content that needs to be annotated in the document using a cursor, so as to annotate the content selected by the cursor online. However, when using the cursor to select text, the user needs to accurately select the content such as text and the like in the document, and the selection is not efficient. In particular, in a case where the user browses the online document using an electronic device with a smaller display screen such as a mobile phone or the like, the document font is small, and it is difficult to select the document content using the cursor, and the user even needs to adjust the cursor position for several times to select the document content, and the selection is less efficient.

In order to solve the above technical problems, in the embodiments of the present disclosure, during the process of displaying a target document on a display interface, a drawing operation of a specific shape performed by a user on the display interface may be detected to obtain a target area corresponding to the specific shape, so as to obtain annotation content input by the user for target content corresponding to the target area. The target content that needs to be annotated may be quickly selected by drawing specific shape on the display interface so as to obtain the annotation content input by the user for the target content corresponding to the target area. The target document may be updated based on an association relationship between the target content and the annotation content so that the target document includes the annotation content associated with the target content. The operation of drawing specific shape on the display interface is simple and convenient, and the user may quickly select the target content without adjusting the cursor, thereby improving the annotation efficiency of the target content that the user needs to annotate.

The embodiments of the present disclosure will be described in detail below with reference to the drawings.

FIG. 1 is a flowchart of an embodiment of a method for processing document provided by the embodiments of the present disclosure. The method may include the following steps:

At Step 101: displaying a target document on a display interface.

The embodiments of the present disclosure may be applied to a user terminal. The user terminal may be configured in electronic devices such as a mobile phone, a computer, a notebook and the like. The embodiments of the present disclosure do not limit the specific types of the electronic devices.

The target document may be an online document and an offline document.

In a case where the target document is an online document, the online document is a web page with multimedia information, such as texts, pictures, videos and the like, and typesetting rules. The web page of the target document may be displayed on a display interface by software such as a browser, a document reading plug-in or the like.

The target document may be a new document generated in real time based on a document template, or it may be an old document that has been generated.

The document content in the target document may include texts, pictures, videos and the like.

In a case where the target document is an offline document, a user may directly open the target document which has been generated.

At Step 102: detecting a drawing operation of a specific shape performed by a user on the display interface to obtain a target area corresponding to the specific shape.

The user may perform a drawing operation of a specific shape on the display interface. The user may trigger the drawing operation using a finger, a mouse or the like. In a case where the user performs the drawing operation, specific shapes may be used, so that the user terminal may identify the drawing operation of the user and obtain the target area.

A curve generated by the drawing operation of the specific shape performed by the user on the display interface may be obtained, and the target area corresponding to the specific shape is determined according to the curve.

The specific shapes may refer to predefined graphical shapes that may be used to select the target area. For example, a specific shape may be a rectangle, an ellipse, a straight line, a wavy line or the like. The specific shapes may be classified as closed shape or non-closed shape according to different characteristics of the specific shapes.

At Step 103: obtaining annotation content input by the user for target content corresponding to the target area.

The target content is an annotation object specified by the user through the selection of the target area. The user may annotate the target content. During the annotation by the user, the user terminal may obtain the annotation content input by the user.

At Step 104: updating and displaying the target document based on an association relationship between the target content and the annotation content so that the target document displayed on the display interface includes the annotation content associated with the target content.

Optionally, a document may include multiple target contents, and each target content may include at least one annotation content, in order to clarify the relationship between the target content and the annotation content. As an embodiment, the method may further include: establishing an association relationship between the target content and the annotation content for the target document.

The association relationship between the target content and the annotation content corresponding to the target content is established in order to associate the annotation content with the target content selected by the user, rather than setting an annotation based on a position or an area in the document, and the association relationship between the annotation content and actual content in the target document may be improved, so as to achieve accurate prompt.

Optionally, the annotation content in the target document may be displayed at the bottom, on the left side or on the right side of the document. The embodiments of the present disclosure do not limit the display position of the annotation content.

In the embodiment of the present disclosure, after the target document is displayed on the display interface, the drawing operation of the specific shape performed by the user on the display interface may be detected to obtain the target area corresponding to the specific shape. After the annotation content input by the user for the target content corresponding to the target area is obtained, the target document may be updated based on the association relationship between the target content and the annotation content so that the target document includes the annotation content associated with the target content. The user may rotate the target content in the target document by drawing the specific shape on the display interface. This operation mode is relatively simple, and it is not necessary to use the cursor to select the text, which is to be selected, word by word, which simplifies the selection operation of the target content and improves its selection efficiency, thereby improving the annotation efficiency of the document.

As an embodiment, before detecting the drawing operation of the specific shape performed by the user on the display interface to obtain the target area corresponding to the specific shape, the method may further include: outputting an annotation prompt control for the target document; and in a case where it is detected that the user triggers a selection operation on the annotation prompt control, switching to a shape drawing state for the user to perform the drawing operation on the display interface.

Optionally, the annotation prompt control may take a manual icon as a control icon.

In some embodiments, drawing prompt information may also be output before the user performs the drawing operation of the ellipse on the display interface to obtain the elliptical target area. As a possible implementation, the drawing prompt information may be displayed in the form of a drawing prompt sub-page, and the drawing prompt information may be used to prompt the user about the specific shapes that can be performed. Based on the drawing prompt information in the drawing prompt sub-page, the user may perform an ellipse selection operation on the document content to be prompted.

Figure 2:
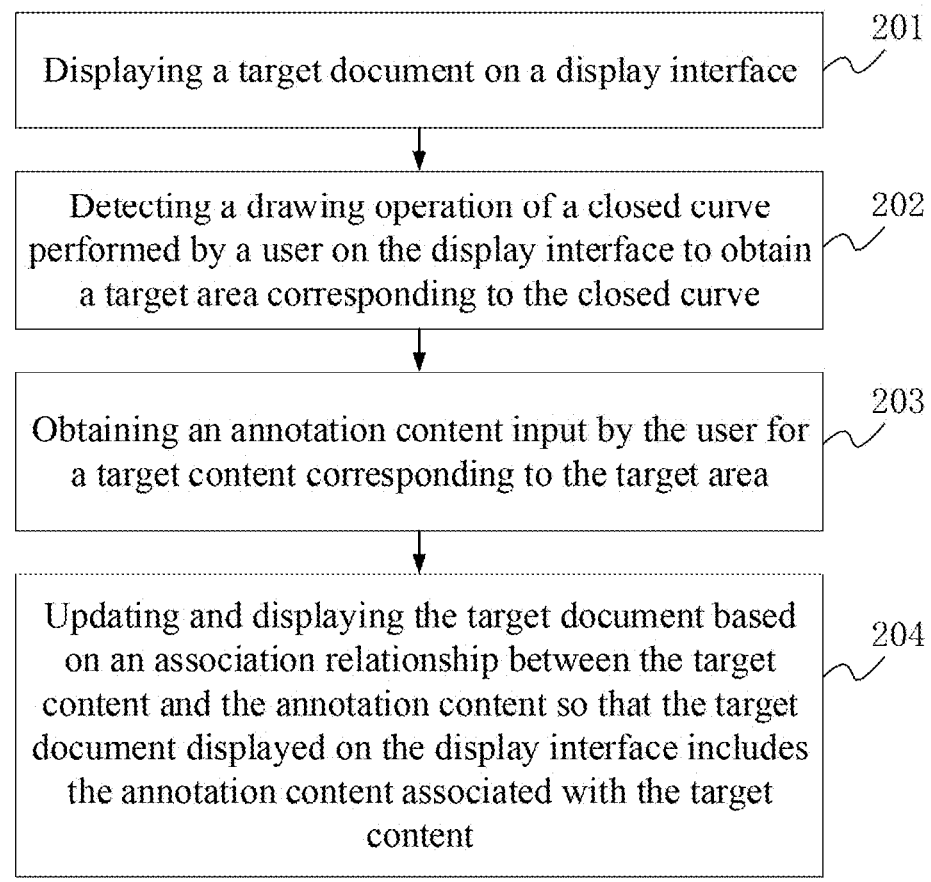
FIG. 2 is a flowchart of another embodiment of a method for processing document provided by the embodiments of the present disclosure.

FIG. 2 is a flowchart of another embodiment of a method for processing document provided by the embodiments of the present disclosure. The method may include the following steps:

At Step 201: displaying a target document on a display interface.

At Step 202: detecting a drawing operation of a closed curve performed by a user on the display interface to obtain a target area corresponding to the closed curve.

At Step 203: obtaining annotation content input by the user for target content corresponding to the target area.

At Step 204: updating and displaying the target document based on an association relationship between the target content and the annotation content so that the target document displayed on the display interface includes the annotation content associated with the target content.

In the embodiment of the present disclosure, the user performs the drawing operation using the closed curve. By detecting the drawing operation of the closed curve performed by the user on the display interface, a convenient experience similar to manually checking the target content that needs to be annotated is provided for the user, which may improve the selection efficiency of the user, thereby improving the annotation efficiency.

In order to obtain an accurate target area, the target area may be determined by the curve drawn by the user. As an embodiment, the detecting the drawing operation of the closed curve performed by the user on the display interface to obtain the target area corresponding to the closed curve includes: obtaining a curve drawn by the user on the display interface; and if the curve is a closed curve, obtaining the target area corresponding to the closed curve.

In a case where the curve is a closed curve, the target area corresponding to the closed curve may be obtained. The target area may be quickly determined by the type of the curve. For example, in a case where the curve is a closed curve, an area size of the closed curve may be determined, and it is determined, based on the text in the region covered by the area of the closed curve, whether a paragraph or a word/short sentence is selected by the closed curve. If it is determined that a paragraph is selected, the area in which the paragraph is located may be determined to be the target area, and if it is determined that a word/short sentence is selected, only the area in which the word/short sentence is located is determined to be the target area.

The following ways may be used to determine whether the curve drawn by the user is a closed curve or not.

As a possible implementation, the obtaining the target area corresponding to the closed curve if the curve is the closed curve includes: if the curve has a point of intersection, then determining that the curve is a closed curve; and obtaining the target area corresponding to the closed curve.

As a possible implementation, the obtaining the target area corresponding to the closed curve if the curve is the closed curve includes: dividing a curve, generated in a case where the user performs a line drawing operation, into at least one line segment; determining drawing directions corresponding to the at least one line segment respectively; if there are two line segments that are drawn in opposite directions and satisfy a parallel condition, then determining that the curve is a closed curve; and obtaining the target area corresponding to the closed curve.

The drawing directions corresponding to the at least one line segment respectively may be determined by the following way: determining first end points and second end points corresponding to the at least one line segment respectively; for each line segment, determining first drawing time for the first end point and second drawing time for the second end point; for any one of the line segments, determining, according to a time sequence of the first drawing time and the second drawing time for the line segment, a generation sequence of the first end point and the second end point of the line segment; and determining the drawing direction of the line segment according to the generation sequence of the first end point and the second end point.

For example, the first end point of a line segment is drawn before its second end point, and the drawing direction of the line segment may be determined to be from the first end point to the second end point. Specifically, the positions of the end points of each line segment may be marked on a coordinate axis to facilitate the determination of its drawing direction.

As a possible implementation, the obtaining the target area corresponding to the closed curve if the curve is the closed curve includes: if the shape of the curve is an ellipse or a rectangle, then determining that the curve is a closed curve; and; obtaining the target area corresponding to the closed curve.

By judging the shape of the curve, it may be directly determined whether the curve is a closed curve. For example, the shape of the curve may be determined in a shape model matching way, and specifically, it may be determined whether the shape of the curve matches with a preset template of an ellipse or a rectangular curve so as to determine the shape of the curve.

Obtaining the target area corresponding to the closed curve is to take the area enclosed by the closed curve as the target area.

As a possible implementation, the obtaining the target area corresponding to the closed curve if the curve is the closed curve includes: if the curve is the closed curve, then obtaining the area, where at least one word enclosed by the closed curve is located, as the target area.

Optionally, in a case where the target document is displayed on the display interface, a screenshot of the page currently displayed on the display interface is obtained, and then the at least one word enclosed by the closed curve may be determined according to the screenshot of the page and the area enclosed by the closed curve.

Figure 3:
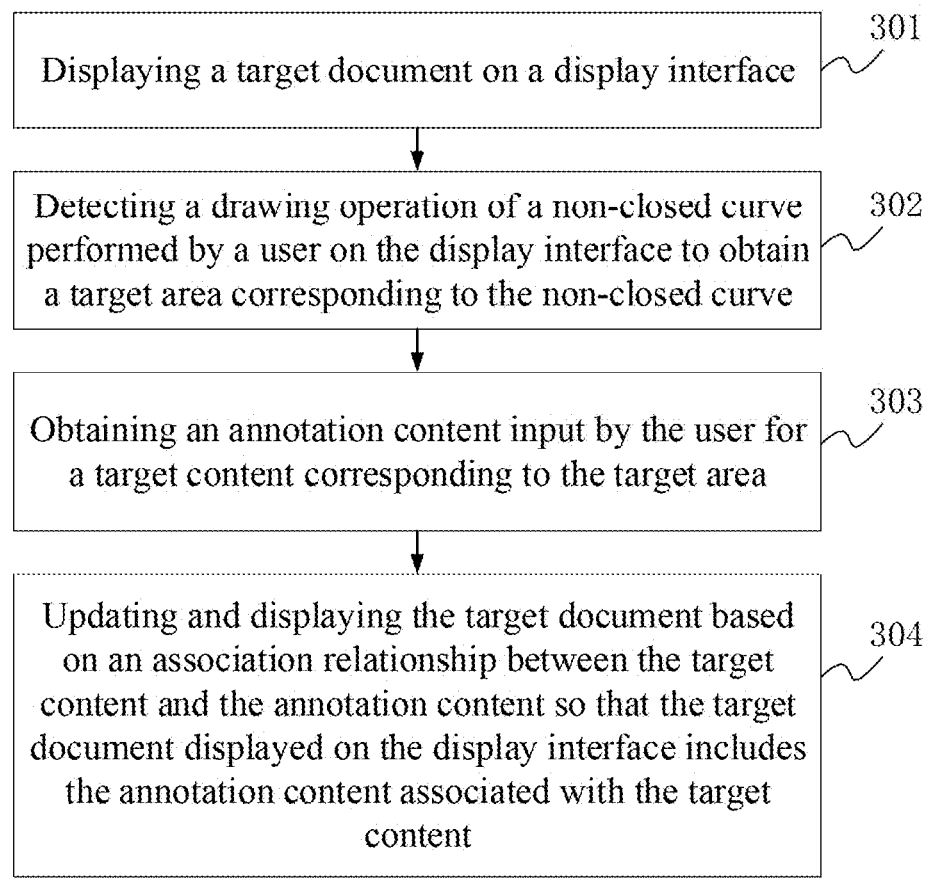
FIG. 3 is a flowchart of another embodiment of a method for processing document provided by the embodiments of the present disclosure.

FIG. 3 is a flowchart of another embodiment of a method for processing document provided by embodiments of the present disclosure. The method may include the following steps:

At Step 301: displaying a target document on a display interface.

At Step 302: detecting a drawing operation of a non-closed curve performed by a user on the display interface to obtain a target area corresponding to the non-closed curve.

At Step 303: obtaining annotation content input by the user for target content corresponding to the target area.

At Step 304: updating and displaying the target document based on an association relationship between the target content and the annotation content so that the target document displayed on the display interface includes the annotation content associated with the target content.

In the embodiment of the present disclosure, the user performs the drawing operation using the non-closed curve. By detecting the drawing operation of the non-closed curve performed by the user on the display interface, the non-closed curve may provide the user with a convenient experience similar to manually checking the target content that needs to be annotated, which may improve the selection efficiency of the user, thereby improving the annotation efficiency.

In order to obtain the accurate target area, as an embodiment, the detecting the drawing operation of the non-closed curve performed by the user on the display interface to obtain the target area corresponding to the non-closed curve, includes: obtaining a curve drawn by the user on the display interface; and if the curve is a non-closed curve, then obtaining the target area corresponding to the non-closed curve.

In a case where a curve drawn by the user is a non-closed curve, the target area corresponding to the non-closed curve is obtained by identifying the shape of the curve drawn by the user.

As a possible implementation, the obtaining the target area corresponding to the non-closed curve if the curve is the non-closed curve includes: determining that the curve is a non-closed curve if the curve does not have a point of intersection and satisfies a parallel condition; and obtaining the target area corresponding to the non-closed curve.

As a possible implementation, the obtaining the target area corresponding to the non-closed curve if the curve is the non-closed curve includes: dividing a curve, generated in a case where the user performs a line drawing operation, into at least one line segment; determining drawing directions corresponding to the at least one line segment respectively; if the drawing directions of the at least one line segment are same, then determining that the curve is a non-closed curve; and obtaining the target area corresponding to the non-closed curve.

The ways for determining the drawing directions of the line segments are the same as the ways for determining the drawing directions of the line segments in the foregoing embodiments, which will not be described again herein.

As another possible implementation, the obtaining the target area corresponding to the non-closed curve if the curve is the non-closed curve includes: if the curve is a straight line and/or a wavy line, then determining that the curve is a non-closed curve; and obtaining the target area corresponding to the non-closed curve.

By judging the shape of the curve, it may be directly determined whether the curve is a non-closed curve. For example, the shape of the curve may be determined in a shape model matching way, and specifically it may be determined whether the shape of the curve matches with a preset template of a straight line or a wave line so as to determine the shape of the curve. To obtain the target area corresponding to the non-closed curve may be to take an area, where an upper or lower line of words closest to the non-closed curve are located, as the target area.

As a possible implementation, the obtaining the target area corresponding to the non-closed curve if the curve is the non-closed curve may include: if the curve is a non-closed curve, then determining the text height of the target document displayed on the display interface; and determining the target area according to an area formed by the text height and the straight-line distance of the non-closed curve.

In a case where the curve drawn by the user is the non-closed curve, an area, where words above the non-closed curve are located, may be taken as the target area. Specifically, the target area may be determined by determining the text height of the target document displayed on the display interface and the straight-line distance of the non-closed curve.

The straight-line distance of the non-closed curve may refer to the length of a projection, on a horizontal axis (an X axis) on the display interface, of a straight line formed in a case where two ends of the non-closed curve are connected.

Figure 4:
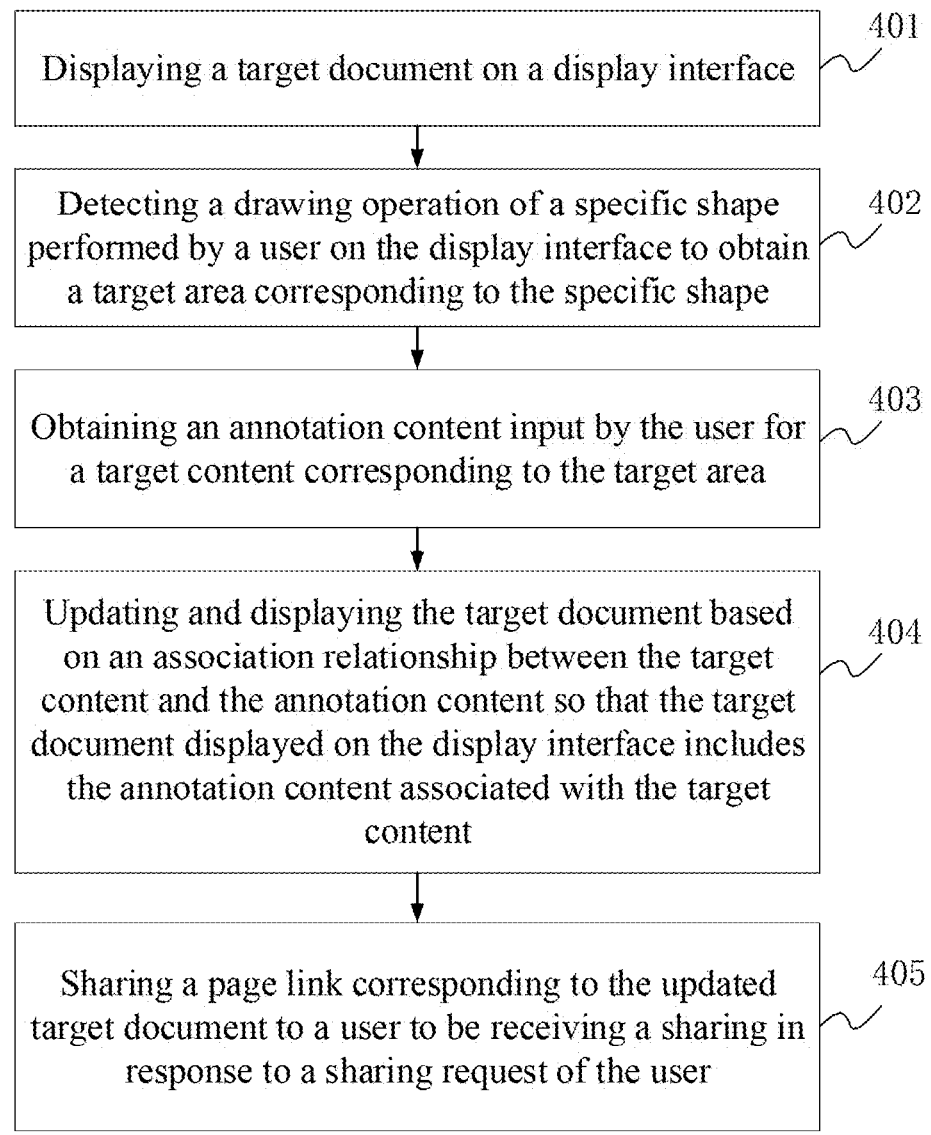
FIG. 4 is a flowchart of another embodiment of a method for processing document provided by the embodiments of the present disclosure.

FIG. 4 is a flowchart of another embodiment of a method for processing document provided by the embodiments of the present disclosure. The method may include the following steps:

At Step 401: displaying a target document on a display interface.

The target document may be a new document generated in real time based on a document template, or it may be an old document that has been generated.

At Step 402: detecting a drawing operation of a specific shape performed by a user on the display interface to obtain a target area corresponding to the specific shape.

At Step 403: obtaining annotation content input by the user for target content corresponding to the target area.

At Step 404: updating and displaying the target document based on an association relationship between the target content and the annotation content so that the target document displayed on the display interface includes the annotation content associated with the target content.

At Step 405: sharing, in response to a sharing request of the user, a page link corresponding to the updated target document to a user to be receiving the sharing.

In the embodiment of the present disclosure, the user may share the target document to an object to be receiving the sharing through a user terminal, so as to let multiple user terminals view the target document at the same time and enable multiple people to comprehensively process the target document. Especially in a case where the target document is an online document, the simultaneous annotation of the online document by multi-terminal networking may be improved, and the multi-terminal interaction effect is enhanced.

As an embodiment, the sharing, in response to a sharing request of the user, a page link corresponding to the updated target document to a user to be receiving the sharing includes: sending a link sharing request to a server terminal in response to a sharing request of the user, so as to enable the server terminal to generate the page link corresponding to the updated target document; displaying a sharing page including at least one user to be receiving the sharing, so as to enable the user to select a user to be receiving the sharing from the sharing page; and sending the user to be receiving the sharing selected by the user to the server terminal so as to enable the server terminal to send the page link to the user to be receiving the sharing.

Further, optionally, after sending the user to be receiving the sharing selected by the user to the server terminal so as to enable the server terminal to send the page link to the user to be receiving the sharing, the method may further include: sending the stored target document, which has the target content and the annotation content associated with the target content, to a server, so as to enable the server, which detects a document viewing request triggered by the user to be receiving the sharing, to output, for the user to be receiving the sharing, the corresponding target document including the target content and the annotation content associated with the target content.

As another embodiment, the sharing, in response to a sharing request of the user, a page link corresponding to the updated target document to a user to be receiving the sharing includes: in response to a sharing request of the user, generating a page link corresponding to the updated target document; displaying a sharing page including at least one user to be receiving the sharing, so as to enable the user to select a user to be receiving the sharing from the shared page; and sending the page link to the user to be receiving the sharing.

Further, optionally, after sending the page link to the user to be receiving the sharing, the method may further include: obtaining a document viewing request triggered by the user to be receiving the sharing for the page link, and outputting, for the user to be receiving the sharing, the corresponding target document including the target content and the annotation content associated with the target content.

In a case where the user terminal directly stores the target document, a page of the target document may be viewed in response to the user to be receiving the sharing, so as to improve the response efficiency.

Figures 5, 6A:
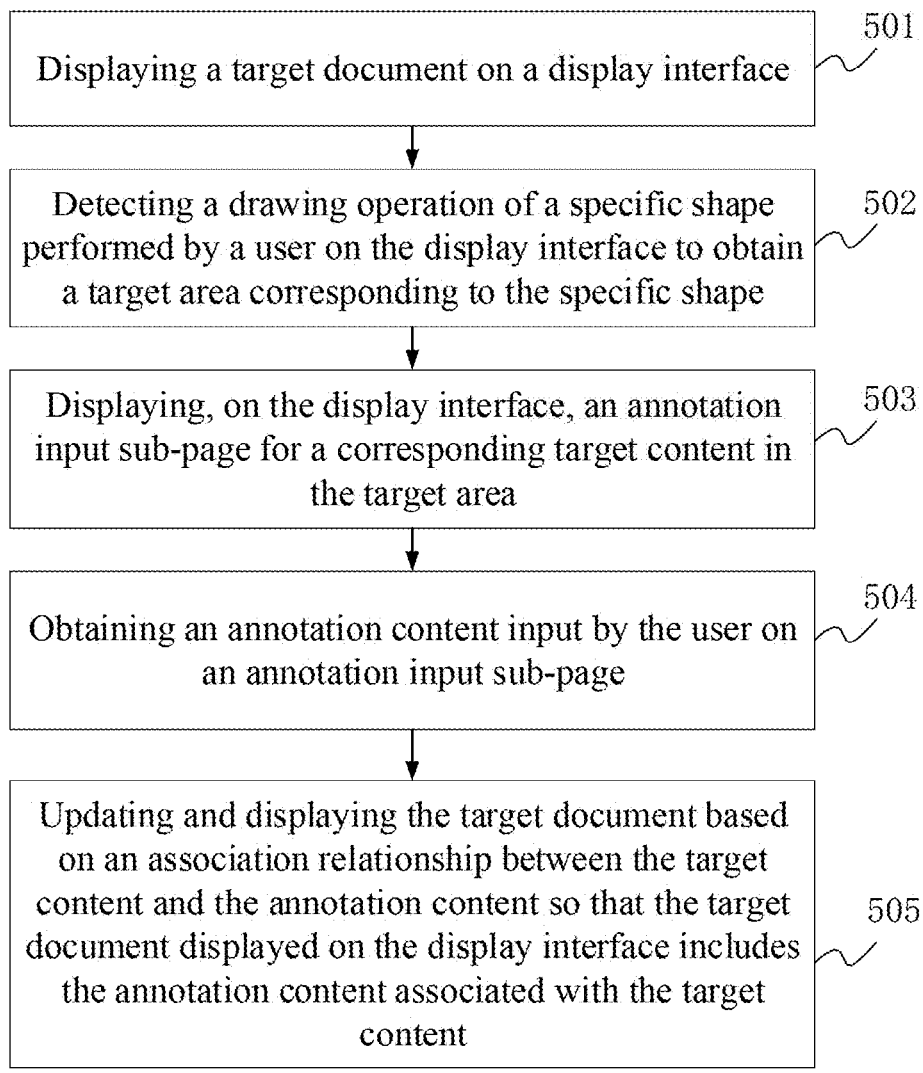
FIG. 5 is a flowchart of another embodiment of a method for processing document provided by the embodiments of the present disclosure.
FIG. 6a is a schematic diagram of selection of target content provided by an embodiment of the present disclosure.

FIG. 5 is a flowchart of another embodiment of a method for processing a document provided by the embodiments of the present disclosure. The method may include the following steps:

At Step 501: displaying a target document on a display interface.

At Step 502: detecting a drawing operation of a specific shape performed by a user on the display interface to obtain a target area corresponding to the specific shape.

At Step 503: displaying, on the display interface, an annotation input sub-page for a corresponding target content in the target area, wherein the annotation input sub-page hovers above a display page of the target document.

At Step 504: obtaining annotation content input by the user on the annotation input sub-page.

At Step 505: updating and displaying the target document based on an association relationship between the target content and the annotation content so that the target document displayed on the display interface includes the annotation content associated with the target content.

In the embodiment of the present disclosure, the annotation input sub-page for the corresponding target content in the target area is displayed on the display interface, and the user may be prompted to input the annotation content for the target content, so as to accurately capture the annotation content input by the user and obtain the accurate content annotated by the user.

The annotation input sub-page may include a text input control to provide a text input function. As an embodiment, the obtaining the annotation content input by the user on the annotation input sub-page includes: detecting a target text input by the user in the text input control of the annotation input sub-page; and determining that the target text is the annotation content.

The text input control may include various input types of input controls, and for example, may include a keyboard spelling input type of input control, a handwriting input type of input control and the like.

In addition to the text input used as the annotation content, multimedia information such as voice and the like may also be used as the annotation content. As another embodiment, the obtaining the annotation content input by the user on the annotation input sub-page includes: detecting a triggering operation of the user for a voice input control in the annotation input sub-page, and switching to a voice collection state to collect a voice signal sent by the user; and determining the annotation content according to the voice signal.

Optionally, the determining the annotation content according to the voice information may include: directly taking the voice information as the annotation content. The determining the annotation content according to the voice information may further include: performing Automatic Speech Recognition (ASR) on the voice information to obtain text information corresponding to the voice information, and taking the text information as the annotation content.

In a case where the Automatic Speech Recognition (ASR) is performed on the voice information, an existing voice recognition algorithm may be referenced, which will not be described again herein.

As an embodiment, before obtaining the annotation content input by the user for the corresponding target content in the target area, the method further includes: determining the target content corresponding to the target area according to at least one word enclosed by the target area.

In some embodiments, the determining the target content corresponding to the target area according to the at least one word enclosed by the target area includes: determining whether the at least one word enclosed by the target area satisfies a sentence composition condition or not; if the at least one word enclosed by the target area satisfies the sentence composition condition, then determining that a complete statement in which the at least one word is located is the target content; and if the at least one word enclosed by the target area fails to satisfy the sentence composition condition, determining that the at least one word is the target content.

The target content corresponding to the target area may be determined according to the at least one word enclosed by a curve drawn by the user. If the at least one word satisfies a sentence composition condition, it may be determined that the user selects a sentence, and the complete sentence in which the word selected by the user is located may be taken as the target content. If the at least one word fails to satisfy the sentence composition condition, the at least one word selected by the user may be directly taken as the target content.

Optionally, determining whether the at least one word satisfies the sentence composition condition may be performed by determining whether the at least one word is similar to a complete sentence through semantic processing of the at least one word in the entire document. In a case where the similarity to a complete sentence is larger than a preset threshold, it may be determined that the at least one word satisfies the sentence composition condition. For example, the ratio of the number of words in the at least one word to the total number of words in the complete sentence, in which the at least one word is located, may be determined, and in a case where the ratio is larger than a preset threshold, it may be determined that the at least one word satisfies the sentence composition condition.

For ease of understanding, as shown in FIG. 6a, in a case where the target area is 601, at least one word enclosed by the target area 601 may be obtained, that is, the contents such as "our update is not as fast as the No. 2 personnel department", "the function is not as complete as the No. 2 personnel department" and the like in the target area 601. After the content is subjected to sentence determination, it may be determined that the user has selected the entire paragraph in which the target area 601 is located, and the complete sentence in which "the overall feeling is that our update is not as fast as the No. 2 personnel department, and the overall function is not as complete as the No. 2 personnel department" is located may be taken as the target content.

As shown in FIG. 6b, in a case where the target area is 602, at least one word enclosed by the target area 602 may be obtained, that is, the words "No. 2 personnel" in 602.

After the words are subjected to sentence determination, it may be determined that the user has selected the words in the target area 602, and the "No. 2 personnel" may be taken as the target content.

Further, optionally, the determining whether the at least one word enclosed by the target area satisfies a sentence composition condition or not includes: performing semantic analysis processing on the position and meaning of the at least one word enclosed by the target area in the target document to determine whether the at least one word satisfies the sentence composition condition or not.

The semantic analysis processing of the at least one word may determine semantic analysis results such as the number of keywords, the number of words, the meaning of sentences and the like in the at least one word. It may be determined whether the at least one word satisfies the sentence composition condition through the semantic analysis results. For example, in a case where the semantic analysis results show that the at least one word includes most of keywords of a paragraph and the number of words in the least one word is relatively large, it may be determined that the at least one word selected by the user satisfies the sentence composition condition.

In order to display existing historical annotations in the target document, as an embodiment, the displaying the target document on the display interface may include: obtaining historical target content of the target document and annotation content associated with the historical target content; generating a display page of the target document including the annotation content associated with the historical target content according to a display parameter of the display interface and a typesetting rule of the target document; and displaying the display page of the target document on the display interface.

With the size limitation of a display screen, the display page may be partially displayed on the display interface.

In actual application, after updating the target document based on the association relationship between the target content and the annotation content so that the target document includes the annotation content associated with the target content, the method further includes: updating the display page of the target document including the annotation content corresponding to the target content according to the display parameter of the display interface and the typesetting rule of the target document.

In a case where the corresponding target document including the target content and the annotation content associated with the target content is displayed on the display interface of the user terminal, the display page of the target document including the annotation content corresponding to the target content may be updated according to the display parameter of the display interface of the user terminal and the typesetting rule of the target document, and the target area in the display page is updated at the same time, so that the target area and the target content fit with the display parameter of the display interface and the typesetting rule of the target document. That is, in a case where the display page of the target document is updated, the document content of the display page and the target area for the selected target content need to be updated, so that the display page matches with the display parameter of the display interface. The display parameter of the display interface may include: length, width, display zoom ratio, display direction, display resolution and the like.

Figure 7:
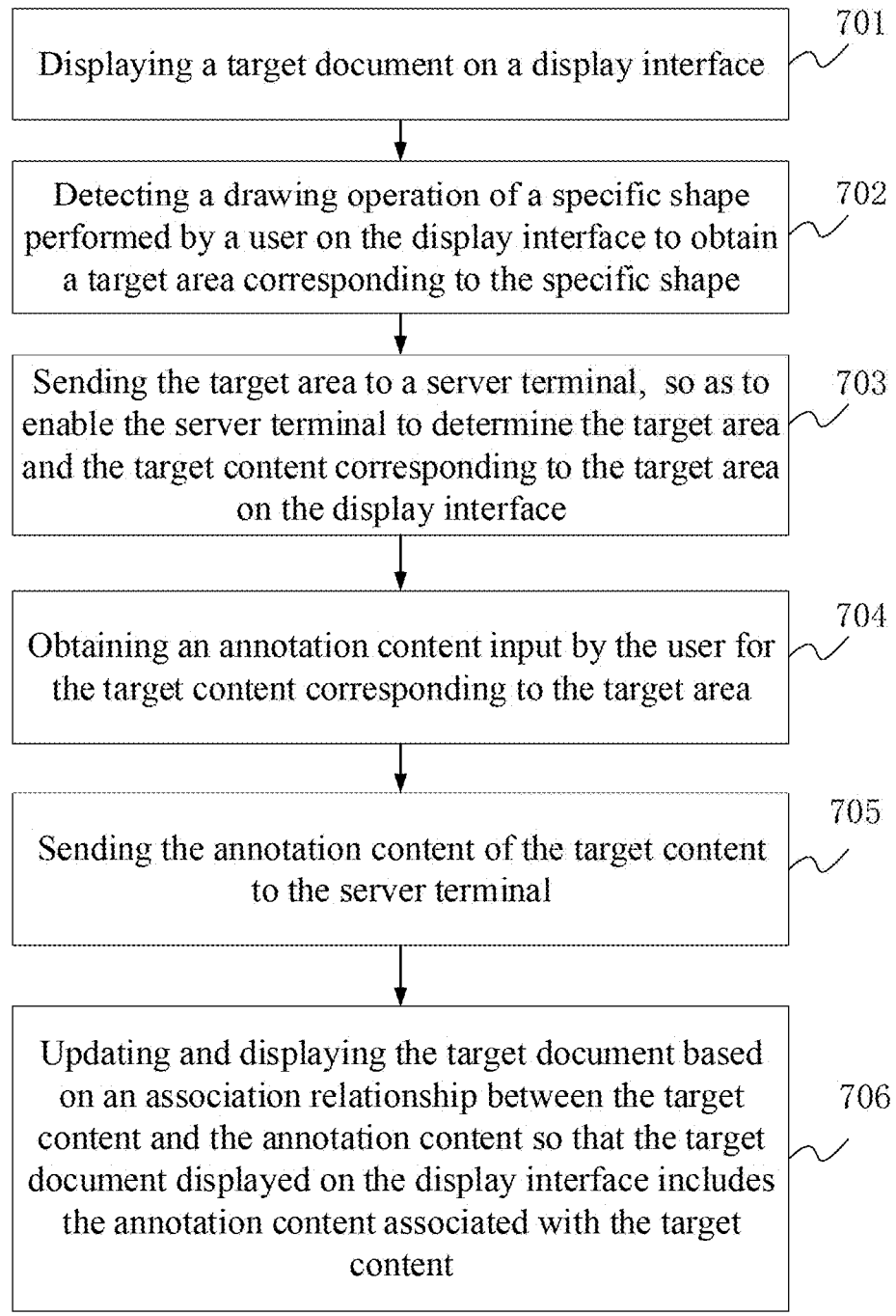
FIG. 7 is a flowchart of another embodiment of a method for processing document provided by the embodiments of the present disclosure.

In addition to being determined by the user terminal, the target area may also be determined by a server terminal. The user terminal needs to send collected information to the server terminal, and thus the server terminal determines the target area. FIG. 7 is a flowchart of another embodiment of a method for processing document provided by the embodiments of the present disclosure. The method may include the following steps:

At Step 701: displaying a target document on a display interface.

The target document may be a new document generated in real time based on a document template, or it may be an old document that has been generated.

At Step 702: detecting a drawing operation of a specific shape performed by a user on the display interface to obtain a target area corresponding to the specific shape.

At Step 703: sending the target area to a server terminal, so as to enable the server terminal to determine the target area and the target content corresponding to the target area on the display interface.

In addition, the target content corresponding to the target area may also be sent by the user terminal to the server terminal.

At Step 704: obtaining annotation content input by the user for target content corresponding to the target area.

At Step 705: sending the annotation content for the target content to the server terminal, so as to enable the server terminal to establish an association relationship between the target content and the annotation content and to update and store the target document based on the association relationship between the target content and the annotation content so that the target document includes the annotation content associated with the target content.

At Step 706: updating and displaying the target document based on the association relationship between the target content and the annotation content so that the target document displayed on the display interface includes the annotation content associated with the target content.

In the embodiment of the present disclosure, the user terminal may send the target area determined by the user terminal and the annotation content corresponding to the target content in the target area to the server terminal, and the server terminal completes the association of the corresponding annotation content with the target content of the target document, which reduces the processing pressure of the user terminal, thereby improving the processing efficiency.

In addition, after the server terminal determines the annotation content associated with the target content corresponding to the target document, the annotation content corresponding to the target content may be sent to other user terminals, so as to enable updating the annotation content of the target document in real time.

As another embodiment, the user terminal may send the collected information, such as a curve obtained by the user performing a drawing operation of a specific shape and the like, to the server terminal, so as to enable the server terminal to update the annotation content associated with the target content of the target document. The detecting the drawing operation of the specific shape performed by the user on the display interface to obtain the target area corresponding to the specific shape includes: detecting the drawing operation of the specific shape performed by the user on the display interface to obtain the curve corresponding to the specific shape; sending the curve to the server terminal, so as to enable the server terminal to obtain the target area according to the obtained curve and to send the target area to the user terminal; and receiving the target area sent by the server terminal.

Figure 8:
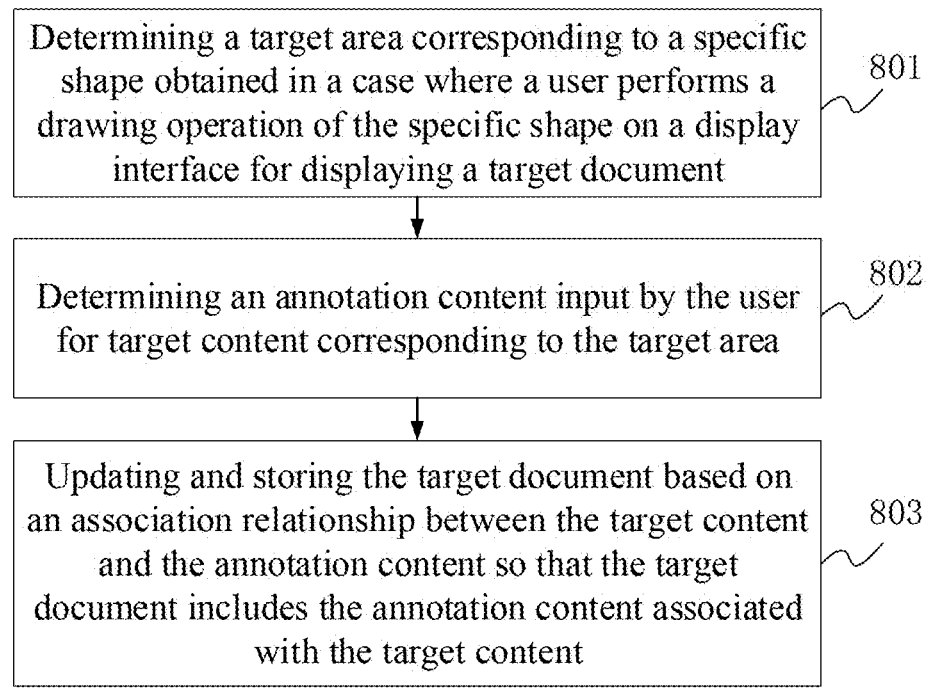
FIG. 8 is a flowchart of another embodiment of a method for processing document provided by the embodiments of the present disclosure.

FIG. 8 is a flowchart of another embodiment of a method for processing document provided by the embodiments of the present disclosure. The method may include the following steps:

At Step 801: determining a target area corresponding to a specific shape, obtained in a case where a user performs a drawing operation of the specific shape on a display interface for displaying a target document.

At Step 802: determining annotation content input by the user for target content corresponding to the target area.

At Step 803: updating and storing the target document based on an association relationship between the target content and the annotation content so that the target document includes the annotation content associated with the target content.

In the embodiment of the present disclosure, a server terminal may determine the target area corresponding to the specific shape obtained in a case where the user performs the drawing operation of the specific shape on the display interface for displaying the target document. Thus, according to the target content corresponding to the target area, the server terminal, after the user directs at the annotation content corresponding to the target area, may update and store the target document based on the association relationship between the target content and the annotation content, so that the target document includes the annotation content associated with the target content. By establishing the association relationship between the target content and the annotation content, the annotation content may be accurately positioned to quickly establish annotation for the target document.

As an embodiment, after updating and storing the target document based on the association relationship between the target content and the annotation content so that the target document includes the annotation content associated with the target content, the method further includes: sending the updated target content to a user terminal, so as to enable the user terminal to update and display, based on the association relationship between the target content and the annotation content, the target document including the annotation content associated with the target content.

In a case where the target document is an online document, different users may view the target document. As an embodiment, the method may further include: detecting a document viewing request triggered by a user to be receiving a sharing for a page link of the target document, and sending the updated target document to a user terminal of the user to be receiving the sharing, so as to enable the user terminal of the user to be receiving the sharing to output the corresponding target document including the target content and the annotation content associated with the target content.

In a case where any user terminal displays the corresponding target document including the target content and the annotation content associated with the target content, according to a display parameter of the display interface of the user terminal and a typesetting rule of the target document, a display page of the target document including the annotation content corresponding to the target content may be updated, and the target area in the display page is updated at the same time, so that the target area and the target content fit with the display parameter of the display interface and the typesetting rule of the target document.

Figure 6C:
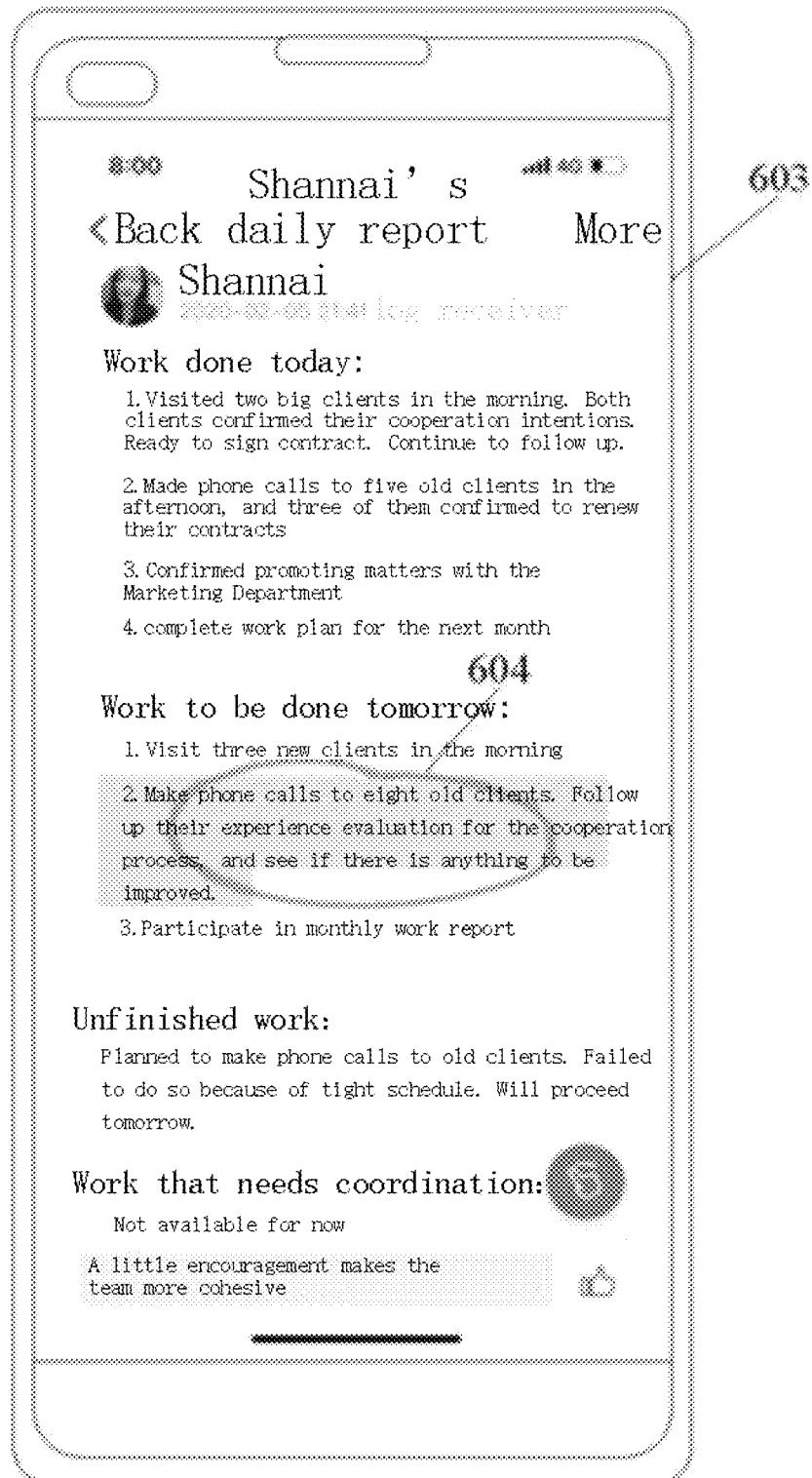
FIG. 6c is a schematic diagram of display of target content provided by an embodiment of the present disclosure.
Figure 6D:
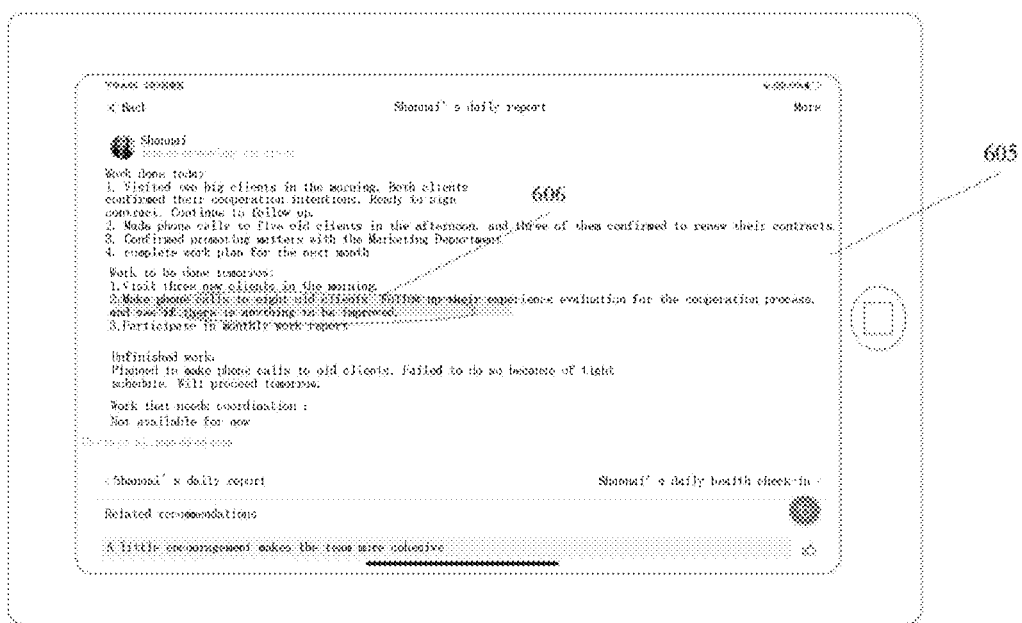
FIG. 6d is a schematic diagram of display of target content provided by an embodiment of the present disclosure.

The user terminal may be configured in different electronic devices with display interfaces having different sizes. Based on the display parameter such as length, width, display zoom ratio, display direction, display resolution and the like of the display interface and the typesetting rules of the target document, the display interface and the target area of the target document including the annotation content corresponding to the target content may be updated. By adaptively displaying the target content and the annotation content associated with the target content according to the display parameter of the display interface and the typesetting rule, an indiscriminate display among different types of electronic devices may be reached. In a case where it is assumed that a display page of a target document is displayed on a display interface 603 of a mobile phone shown in FIG. 6c, the user draws an elliptical target area 604 on the display interface. In a case where the target document is displayed on display interfaces of other types of electronic devices, for example, a display interface of a tablet computer is larger than the display interface of the mobile phone, the display interface 605 of the tablet computer as shown in FIG. 6d may update and display a display page of the annotation content corresponding to the target content according to display parameter and typesetting rule of the tablet computer, so that a target area 606 displayed on the display interface fits with the display parameter and the typesetting rule of the tablet computer.

As an embodiment, before detecting the document viewing request triggered by the user to be receiving the sharing for the page link of the target document, and sending the updated target document to the user terminal of the user to be receiving the sharing so as to enable the user terminal of the user to be receiving the sharing output the corresponding target document including the target content and the annotation content associated with the target content, the method may further include: receiving a link sharing request sent by the user; generating a page link corresponding to the updated target document in response to the link sharing request; and receiving a user to be receiving the sharing sent by the user terminal, so as to send the page link to the user to be receiving the sharing.

As an embodiment, the determining the target area corresponding to the specific shape obtained in a case where the user performs the drawing operation of the specific shape on the display interface for displaying the target document, may include: receiving the target area, sent by the user terminal of the user, corresponding to the specific shape obtained in a case where the user performs the drawing operation of the specific shape on the display interface for displaying the target document.

The server terminal may receive the target area determined by the user terminal directly from the user terminal.

In addition, the server terminal may also receive the target content corresponding to the target area directly from the user terminal.

As another embodiment, the updating and displaying the target document based on the association relationship between the target content and the annotation content so that the target document on the display interface includes the annotation content associated with the target content, may include: establishing a connection line for the target area and the annotation content associated with the target content; and displaying, on the display interface, based on the association relationship between the target content and the annotation content, the target document corresponding to the target area and the annotation content associated with the target content which are connected using the connection line.

Optionally, the establishing the connection line for the target area and the annotation content associated with the target content may include: taking any point in the target area and any point in an area where the annotation content is located as two ends of the connection line, and connecting the two ends using a predetermined type of line.

In a possible implementation, any point on the curve obtained by performing, by the user, the drawing operation of the specific shape and any point on a border of the area where the annotation content is located may be used as the two ends of the connection line, and the two ends are connected using the predetermined type of line. In order to improve display efficiency and enable the intuitive display, a point on the curve and a point on the border of the annotation content may be taken as the two ends of the connection line, if the distance between the two points is smaller than the ones between any point on the curve and any point on the border.

The line type may be a dotted line, a solid line, a wavy line, a curved line or the like, and there is not too much specific limitation to the line type. For ease of understanding, in FIG. 9, a point on the curve 901 in the target area is connected, by the dotted line 903, to a point on the border 902 of the annotation content associated with the target content corresponding to the target area.

As another embodiment, during the process of displaying the target document on the display interface, the method may further include: detecting a viewing request of the user for all annotation contents of the target document, and outputting an annotation page including all the annotation contents on the display interface.

As a possible implementation, in a case where any annotation content is displayed, the target content associated with the annotation content may be displayed.

Figure 10:
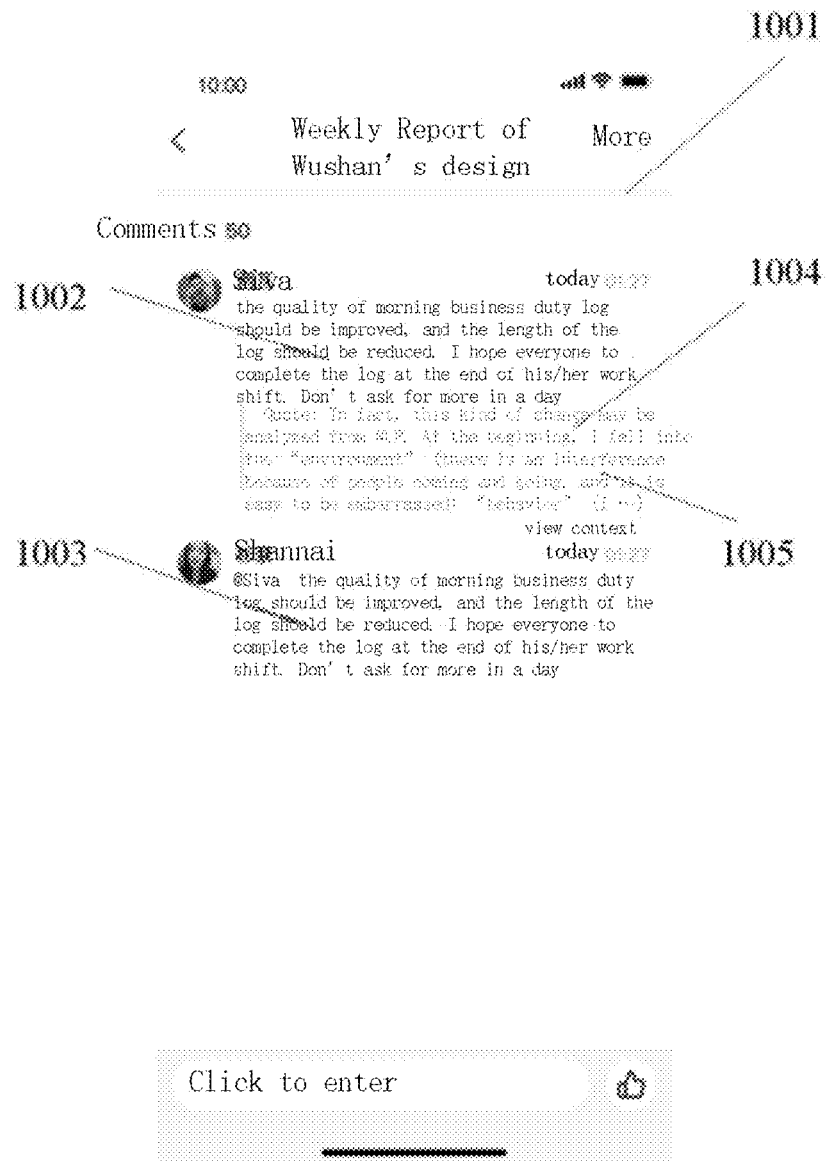
FIG. 10 is a schematic diagram of an annotation page provided by an embodiment of the present disclosure.

All the annotation contents may be displayed within one page at the same time. In order to indicate an annotated object of the annotation content, the target content associated with the annotation content may be associatively displayed. On the annotation page, in a case where the target content associated with the annotation content is displayed, a display level of the annotation content may be set to be higher than a display level of the target content. For example, the annotation content may be displayed normally, while the target content is displayed on a lower right side of the annotation content, and a font color of the target content is set to be lighter than a font color of the annotation content, for example, in a case where the font of the annotation content is set to be black, the font of the target content is set to be gray. In some embodiments, in a case where the target content has a large number of words, a part of the target content may be displayed, and a viewing prompt control is set for the annotation content corresponding to the displayed part of the target content. In a case where the user triggers the viewing prompt control, it may jump to the target document corresponding to the target content, so that the user may view the complete target content. For ease of understanding, FIG. 10 is a schematic diagram of an annotation page provided by an embodiment of the present disclosure. On the annotation page 1001, two annotation contents, namely, an annotation content 1002 and an annotation content 1003, are displayed. In order to indicate the annotated object of the annotation content 1002, the target content 1004 corresponding to the annotation content 1002 is displayed on a lower right side of the annotation content 1002; and in order to distinguish the annotation content from the target content, the font of the annotation content 1002 is black, and the font of the target content 1004 is gray. Because of the large number of words in the target content 1004, only a part of the target content 1004 is displayed. In order to facilitate the user to view the complete target content, the viewing prompt control 1005 for the target content is displayed below the target content 1004. The viewing prompt control, entitled "View Context", exists in the form of a link. In a case where it is detected that the user triggers a click operation of the viewing prompt control 1005, it may jump to the target document corresponding to the target content 1004, so that the user may view the complete target content.

As another embodiment, during the process of displaying the target document on the display interface, the method may further include: detecting the click operation triggered by the user for any position of the target area, and displaying, in the target document displayed on the display interface, the annotation content associated with the target content in the target area.

Any position of the target area may refer to any position on the curve corresponding to the target area, any position enclosed by the target area, or any position of a tag corresponding to the target area.

Figure 11:
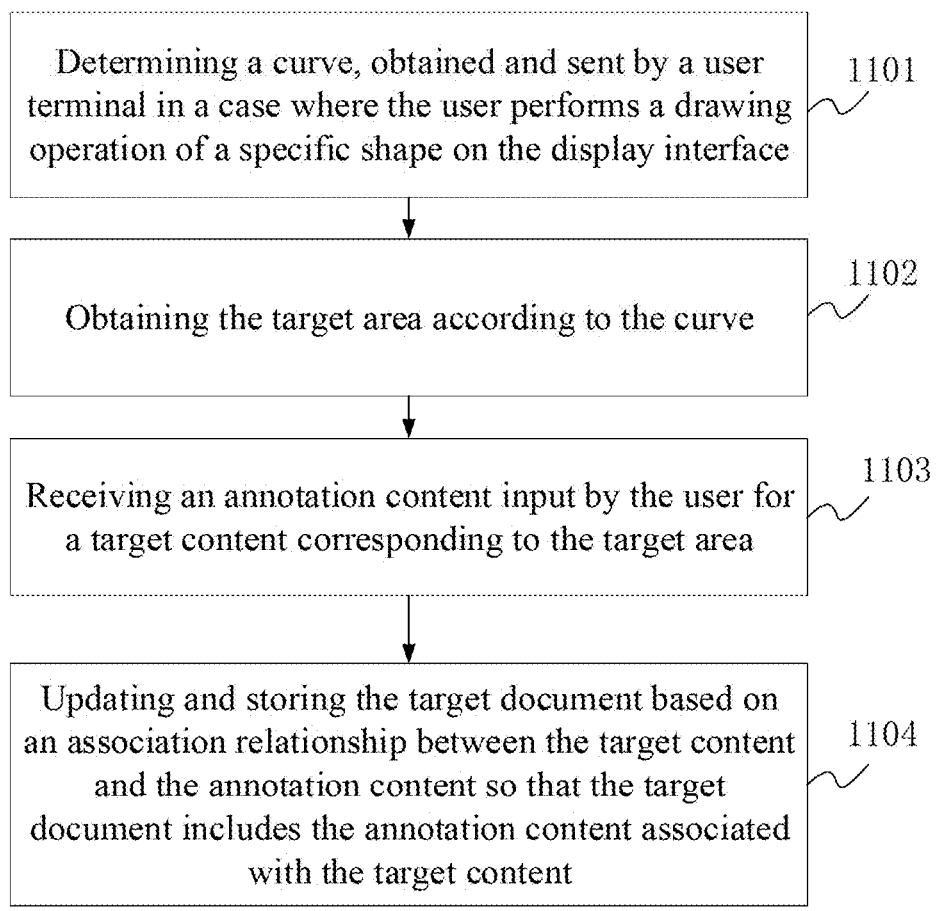
FIG. 11 is a flowchart of another embodiment of a method for processing document provided by the embodiments of the present disclosure.

FIG. 11 is a flowchart of another embodiment of a method for processing document provided by the embodiments of the present disclosure. The method may include the following steps:

At Step 1101: determining a curve, obtained and sent by a user terminal in a case where the user performs a drawing operation of a specific shape on the display interface.

Optionally, the user terminal may directly send, to a server terminal, a page screenshot of both the curve drawn by the user on the display interface and the target document, so as to enable the server terminal to identify the curve of a specific shape drawn on the display interface. The user terminal may also directly send the identified curve on the display interface to the server terminal.

At Step 1102: obtaining the target area according to the curve.

The target area is obtained after the user terminal detects the drawing operation of the specific shape performed by the user on the display interface.

At Step 1103: receiving annotation content input by the user for target content corresponding to the target area.

At Step 1104: updating and storing the target document based on an association relationship between the target content and the annotation content so that the target document includes the annotation content associated with the target content.

In the embodiment of the present disclosure, by determining the curve obtained and sent by the user terminal in a case where the user performs the drawing operation of the specific shape on the display interface, the server terminal may determine the target area according to the curve, so as to accurately determine the target area.

As an embodiment, the obtaining the target area according to the curve, includes: if the curve is a closed curve, then obtaining a target area corresponding to the closed curve.

As a possible implementation, if the curve is a closed curve, the obtaining the target area corresponding to the closed curve includes: dividing a curve, generated in a case where the user performs a line drawing operation, into at least one line segment; determining drawing directions corresponding to the at least one line segment respectively; if there are two line segments that are drawn in opposite directions and satisfy a parallel condition, then determining that the curve is a closed curve; and obtaining the target area corresponding to the closed curve.

As another possible implementation, if the curve is a closed curve, the obtaining the target area corresponding to the closed curve includes: if a shape of the curve is an ellipse or a rectangle, then determining that the curve is a closed curve; and obtaining the target area corresponding to the closed curve.

To obtain the target area corresponding to the closed curve may be to take an area, enclosed by the closed curve on the display interface, of a display page of the target document as the target area.

As another possible implementation, if the curve is a closed curve, the obtaining the target area corresponding to the closed curve includes: if the curve is a closed curve, obtaining an area, in which at least one word enclosed by the closed curve is located, as the target area.

The processes for implementing some steps in the embodiment of the present disclosure are the same as those processes for implementing the corresponding steps in the foregoing embodiments, which will not be described again here.

As another embodiment, the obtaining the target area according to the curve includes: if the curve is a non-closed curve, obtaining a target area corresponding to the non-closed curve.

As a possible implementation, if the curve is a non-closed curve, the obtaining the target area corresponding to the non-closed curve, includes: dividing a curve, generated in a case where the user performs a line drawing operation, into at least one line segment; determining drawing directions corresponding to the at least one line segment respectively; if the drawing directions of the at least one line segment are all same, then determining that the curve is a non-closed curve; and obtaining the target area corresponding to the non-closed curve.

As another possible implementation, if the curve is a non-closed curve, the obtaining the target area corresponding to the non-closed curve includes: if the curve is a straight line and/or a wavy line, then determining that the curve is a non-closed curve; and obtaining the target area corresponding to the non-closed curve.

As another possible implementation, if the curve is a non-closed curve, the obtaining the target area corresponding to the non-closed curve includes: if the curve is a non-closed curve, then determining a text height of the target document displayed on the display interface; and determining the target area according to an area formed by the text height and the straight-line distance of the non-closed curve.

The processes for implementing some steps in the embodiment of the present disclosure are the same as those for implementing the corresponding steps in the foregoing embodiments, which will not be described again here.

In a possible application scenario, in a case where the target document is an online document, multiple users may view the online document at the same time and simultaneously annotate the target document using their respective user terminals.

Figure 12:
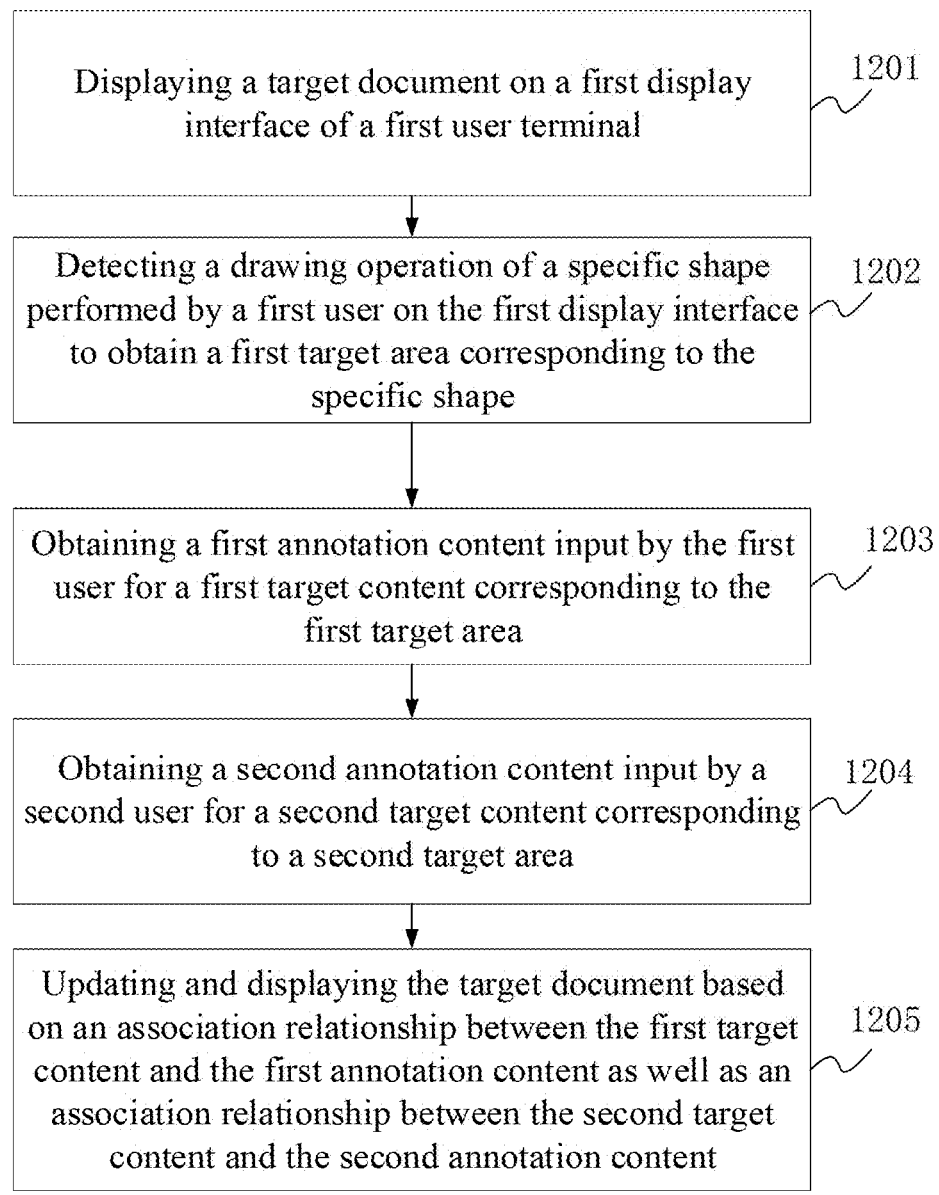
FIG. 12 is a flowchart of another embodiment of a method for processing document provided by the embodiments of the present disclosure.

FIG. 12 is a flowchart of another embodiment of a method for processing document provided by the embodiments of the present disclosure. The method may include the following steps:

At Step 1201: displaying a target document on a first display interface of a first user terminal.

At Step 1202: detecting a drawing operation of a specific shape performed by a first user on the first display interface to obtain a first target area corresponding to the specific shape.

At Step 1203: obtaining a first annotation content input by the first user for a first target content corresponding to the first target area.

At Step 1204: obtaining a second annotation content input by a second user for a second target content corresponding to a second target area. The second target area is obtained by detecting, by a second user terminal, a drawing operation of a specific shape performed by the second user for the target document displayed on a second display interface.

At Step 1205: updating and displaying the target document based on an association relationship between the first target content and the first annotation content as well as an association relationship between the second target content and the second annotation content so that the target document displayed on the first display interface includes the first annotation content associated with the first target content and the second annotation content associated with the second target content.

Both the first user terminal and the second user terminal may perform the methods for processing document as shown in FIG. 1 to FIG. 5 and FIG. 7, and the specific processing steps thereof have been described in detail in the foregoing embodiments, which will not be described again here.

In some embodiments, there may be multiple second user terminals.

In the embodiment of the present disclosure, a first user may annotate the target document by the first user terminal; a second user may annotate the target document by the second user terminal; and the first user terminal, on the basis of obtaining the first annotation content input by the first user for the first target content corresponding to the first target area, may also obtain the second annotation content input by the second user for the second content corresponding to the second target area, so that the target document displayed on the first display interface includes the first annotation content associated with the first target content and the second annotation content associated with the second target content based on the association relationship between the first annotation content and the first target content as well as the association relationship between the second annotation content and the second target content. By obtaining and displaying annotations of the user and other users, the annotation content of the target document may be simultaneously displayed by multiple user terminals, thereby improving the display efficiency.

In order to introduce the technical solution of the embodiment of the present disclosure in detail, the technical solution of the embodiment of the present disclosure is introduced in detail by taking a log as an example of the target document and a mobile phone as an example of the user terminal used by the user.

Figure 13A:
FIG. 13a is an exemplary diagram of document processing provided by an embodiment of the present disclosure.

Logs are documents generated by online document processing modules of various instant messaging software, which may record information such as work contents, exercise information, visit records and the like performed in different time units such as hour, day, week or month for the user. The user may use a log template provided by a document processing module to generate a log. FIG. 13a illustrates a log 1302 displayed on a display interface 1301 of a mobile phone M1 used by a user.

Figure 13B:
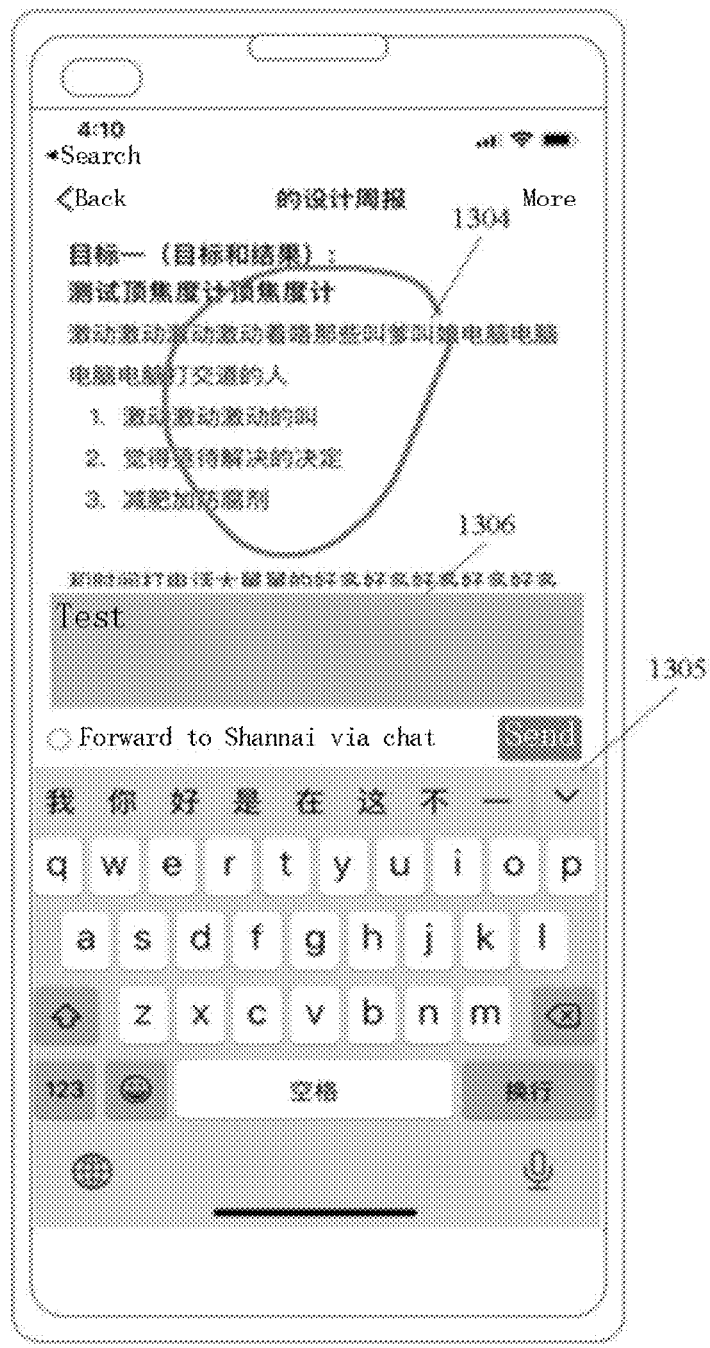
FIG. 13b is an exemplary diagram of document processing provided by an embodiment of the present disclosure.

The display interface 1301 also displays an annotation prompt control 1303. In a case where the user triggers the annotation prompt control, it may switch to a shape drawing state. The user may perform the drawing operation of the specific shape on the mobile phone M1 using a finger. In a case where it is assumed that the specific shape drawn by the user is an ellipse, as shown in FIG. 13b, the mobile phone M1 detects the drawing operation of the ellipse performed by the user on the display interface 1301 to obtain an elliptical target area 1304. Later, the user terminal may determine the target content corresponding to the target area 1304.

In a possible implementation, as shown in FIG. 13b, after the mobile phone M1 obtains the target area 1304, an annotation input sub-page 1305 is provided for the user. In actual application, the annotation input sub-page may include a text input control 1306. The user may input the annotation content "Test" in the text input control 1306.

Figure 13C:
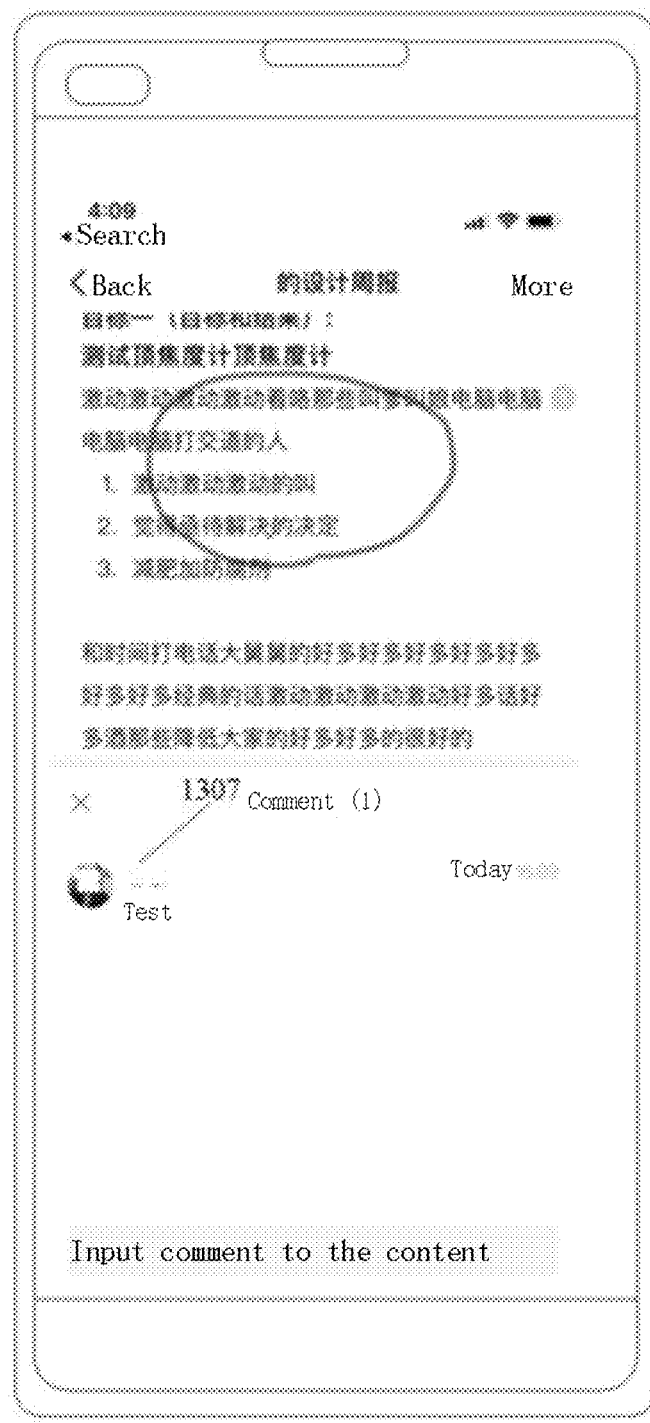
FIG. 13c is an exemplary diagram of document processing provided by an embodiment of the present disclosure.

Later, the user terminal may update and display the target document based on the association relationship between the target content and the annotation content so that the target document displayed on the display interface includes the annotation content associated with the target content. As shown in FIG. 13c, the target document displayed on the display interface includes an annotation content 1307 added by the user to the target content.

Figure 13D:
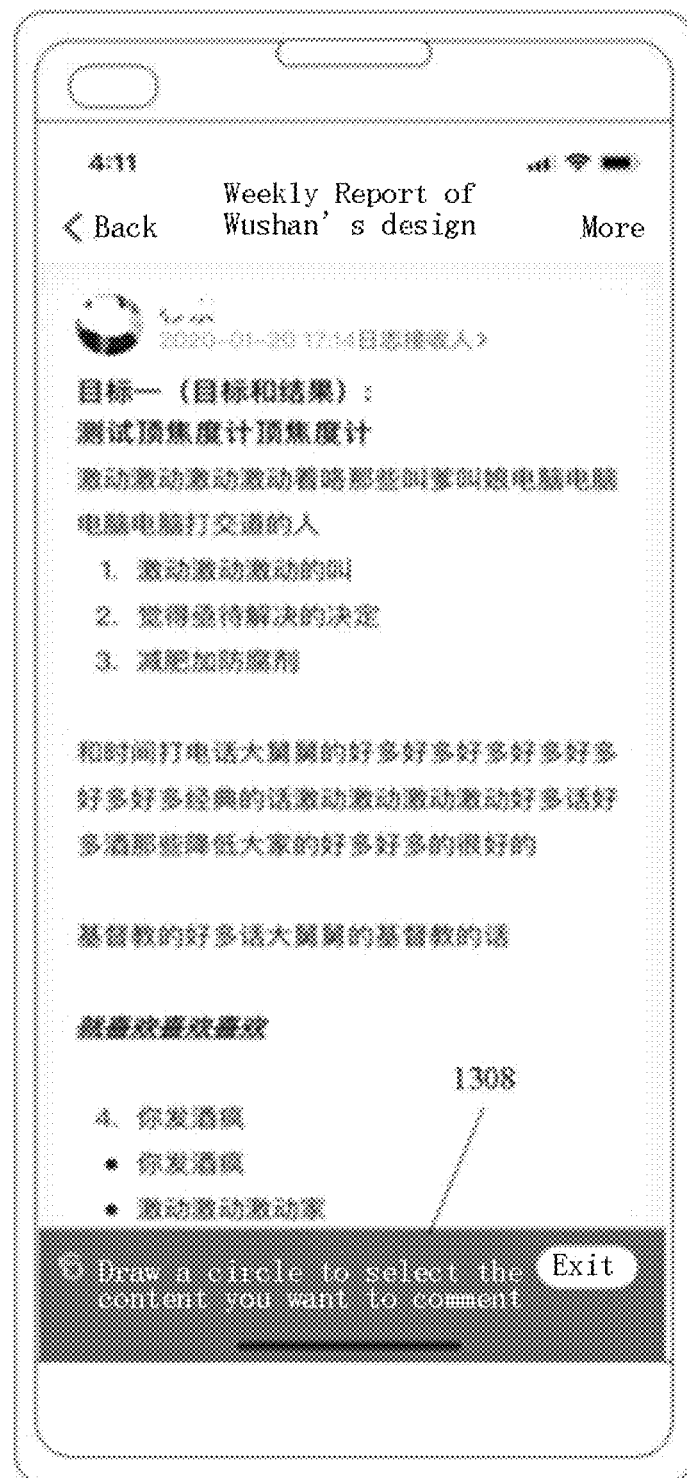
FIG. 13d is an exemplary diagram of document processing provided by an embodiment of the present disclosure.

Furthermore, in some embodiments, drawing prompt information may also be provided before the user performs the drawing operation of the ellipse on the display interface 1301 to obtain the elliptical target area 1304. As a possible implementation, the drawing prompt information may be displayed in the form of a drawing prompt sub-page, and the drawing prompt information may be used to prompt the user for specific shapes that may be performed. FIG. 13d illustrates a drawing prompt sub-page 1308 corresponding to the drawing prompt information. Based on the drawing prompt information in the drawing prompt sub-page 1308, the user may perform an ellipse selection operation on the document content to be prompted.

The target document is a web page during the implementation of an online document. In a possible application scenario, the target document may be replaced with the web page. The web page may be quickly annotated by drawing a circle, drawing a line or the like. Especially for instant messaging scenarios, during an instant messaging process, communication messages that have been sent may be commented to improve the communication efficiency. At this time, the technical solution of the embodiment of the present disclosure may be applied to an annotation scenario of an instant messaging page.

Figure 14:
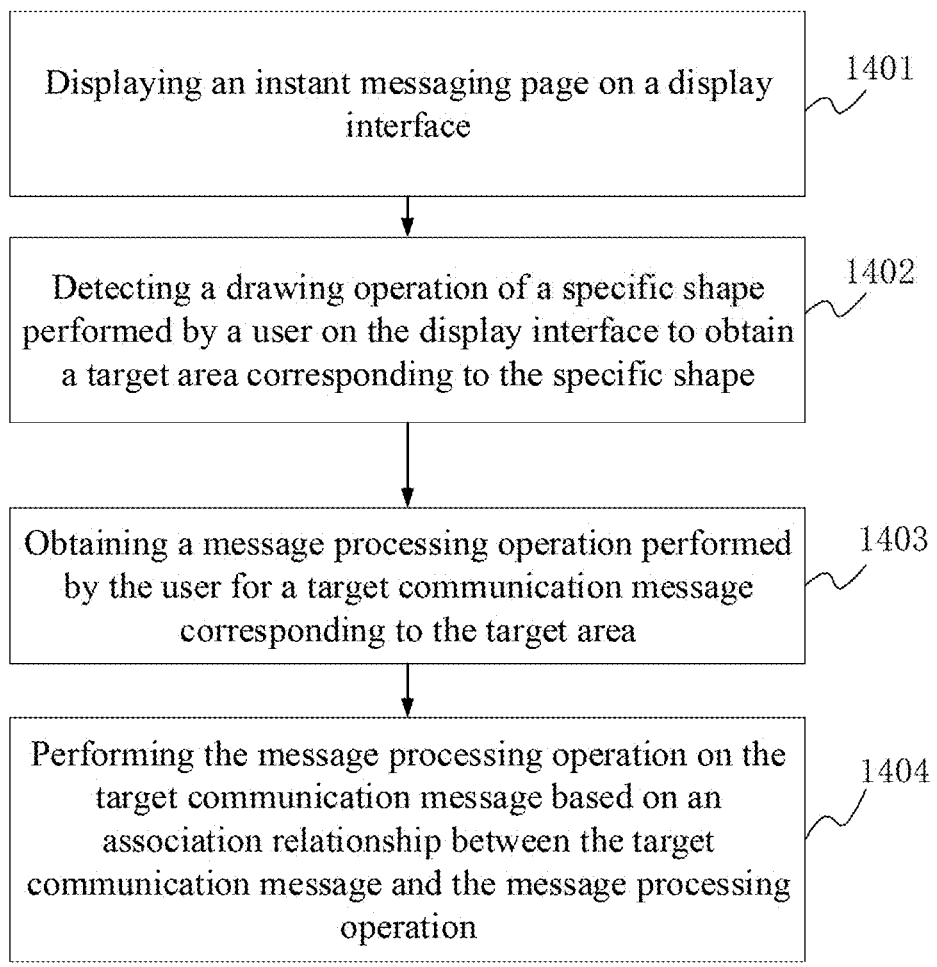
FIG. 14 is a flowchart of an embodiment of a method for processing page provided by the embodiments of the present disclosure.

FIG. 14 is a flowchart of another embodiment of a method for processing page provided by the embodiments of the present disclosure. The method may include the following steps:

At Step 1401: displaying an instant messaging page on a display interface.

The instant messaging page includes at least one communication message.

The embodiment of the present disclosure may be applied to a user terminal. The user terminal may be configured in electronic devices such as a mobile phone, a computer, a notebook, a wearable device, a smart speaker with a display screen and the like. The embodiment of the present disclosure does not limit the specific type of the electronic device.

It should be noted that, the technical solution of the embodiment of the present disclosure is the same as the specific technical solutions shown in FIG. 1 to FIG. 5 and FIG. 7, other than this only difference, i.e., substituting an instant messaging page for an online target document and substituting a target communication message corresponding to a specific shape selected by a user for a target content. The specific steps, implementation solutions and technical effects used in an implementation of the embodiment of the present disclosure may refer to the contents of the foregoing embodiments, which will not be described again here.

At Step 1402: detecting a drawing operation of a specific shape performed by a user on the display interface to obtain a target area corresponding to the specific shape.

Figure 15:
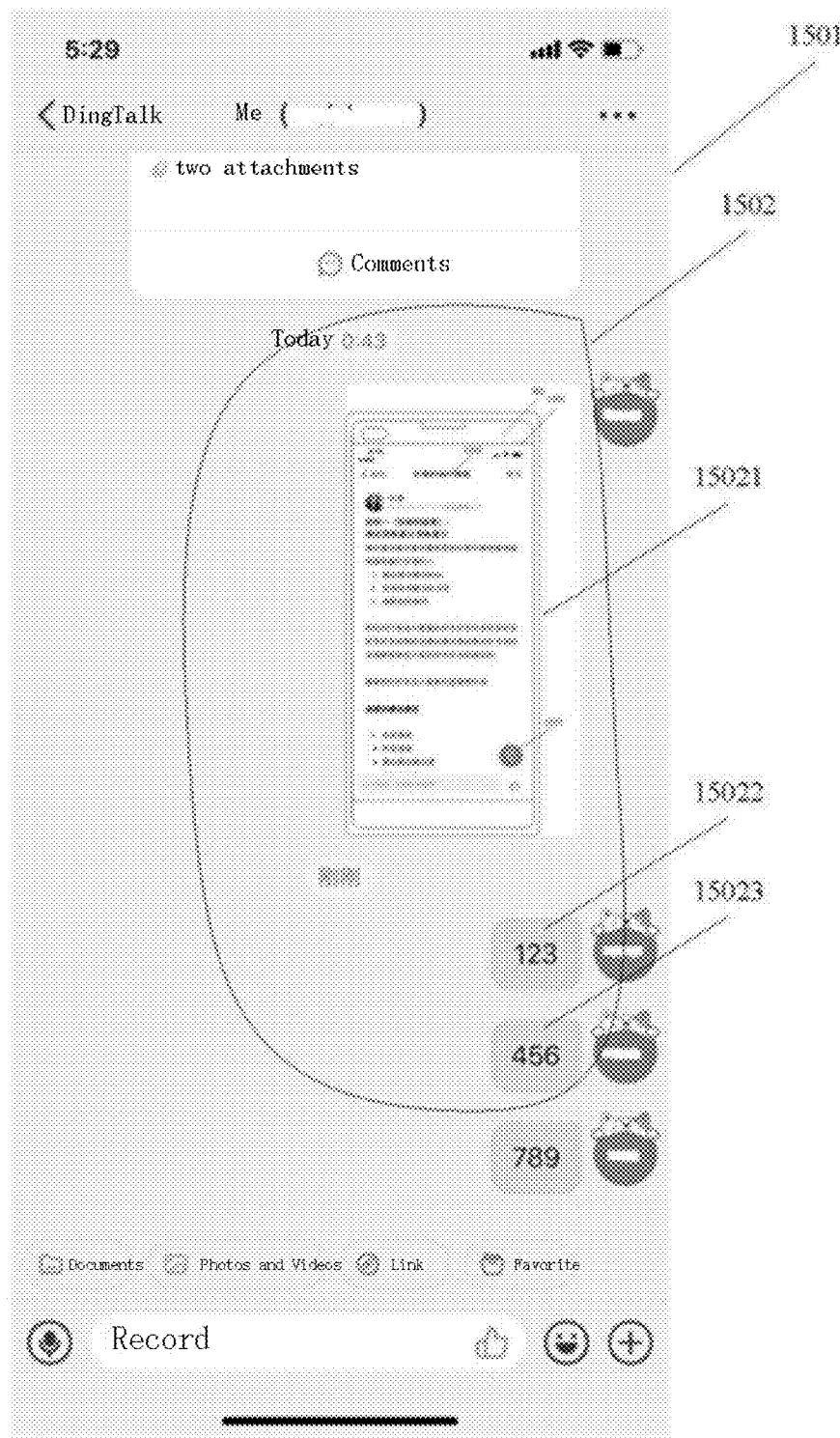
FIG. 15 is an exemplary diagram of an instant messaging page provided by an embodiment of the present disclosure.

For ease of understanding, FIG. 15 is an exemplary figure of an instant messaging page 1501 displaying multiple communication messages. The user may perform the drawing operation of the specific shape on the display interface. Taking an ellipse as an example of the specific shape, a target area 1502 may be obtained in a case where the user draws the ellipse on the instant messaging page 1501. A communication message 15021, a communication message 15022 and a communication message 15023 in the target area 1502 are target communication messages corresponding to the target area 1502. It should be noted that the target area shown in FIG. 15 is only schematic and should not constitute a limitation to a way for selecting target area in the embodiment of the present disclosure. Any technical solution for selecting a message by drawing belongs to the content protected by the technical solution of the present disclosure.

At Step 1403: obtaining a message processing operation performed by the user for a target communication message corresponding to the target area.

There may be various types of message processing operations, for example, log announcing operations, exercise reminding operations, data monitoring operations, email sending operations and the like. All technical solutions for selecting the target communication message by drawing belong to the protection scope of the embodiment of the present disclosure.

At Step 1404: performing the message processing operation on the target communication message based on an association relationship between the target communication message and the message processing operation.

In the embodiment of the present disclosure, for the instant messaging page, the messages on the instant messaging page may be selected by a simple drawing operation to obtain the target communication messages, so as to improve the selection efficiency of the messages. Thus, the problem of lower efficiency of selecting messages caused by clicking messages on the instant messaging page one by one is solved.

As an embodiment, the obtaining the message processing operation performed by the user for the target communication message corresponding to the target area may include: obtaining an annotation content input by the user for the target communication message corresponding to the target area.

The performing the message processing operation on the target communication message based on the association relationship between the target communication message and the message processing operation may include: updating and displaying the instant messaging interface based on an association relationship between the target communication message and the annotation content to display, on the display interface, the annotation content corresponding to the target communication message.

The content type of the annotation content may be multimedia types such as words, voices, pictures and the like.

In some application scenarios, the user may reply to the target communication message, cited as a reference message, corresponding to the target area, and at this time, the annotation content may constitute a new instant messaging message on the display interface. The annotation content may be used as a reply to the cited message, which is the target communication message corresponding to the selected target area, to improve conversation efficiency.

In the embodiment of the present disclosure, the user terminal may display the instant messaging page on the display interface. The instant messaging page may include at least one communication message. The user may view an instant messaging page displayed on the display interface and trigger, on the instant messaging page, the drawing operation of the specific shape for the instant messaging page displayed on the display interface to obtain the target area corresponding to the specific shape. The instant communication message that needs to be annotated may be simply selected by drawing on the page, and at this time, the annotation content input by the user for the target communication message corresponding to the target area may be obtained. Thus, the instant messaging page may be updated and displayed based on the association relationship between the target communication message and the annotation content to display, on the display interface, the annotation content corresponding to the target communication message. The communication messages in the instant messaging page may be quickly selected through simple options to realize quick reply or quick annotation, so as to improve conversation efficiency.

As an embodiment, the method may further include: determining the target communication message corresponding to the target area in the at least one communication message on the instant messaging page.

The target communication message may refer to a communication message in the instant messaging page in the target area. As a possible implementation, the communication message enclosed in the target area selected by the user may be detected.

As another embodiment, the obtaining the message processing operation performed by the user for the target communication message corresponding to the target area may include: obtaining a message forwarding operation performed by the user for the target communication message corresponding to the target area.

The performing the message processing operation on the target communication message based on the association relationship between the target communication message and the message processing operation includes: forwarding the target communication message to a target user terminal based on an association relationship between the target communication message and the message forwarding operation, so that the target user terminal may display the target communication message.

Forwarding message is a way of processing message frequently used in an instant messaging scenario. In an existing way of forwarding message, in particular, when forwarding a part of messages, a user is needed to manually select the messages one by one. In the embodiment of the present disclosure, the user quickly selects the target area by drawing to forward the target communication message corresponding to the target area, and thus the message may be quickly selected and forwarded, thereby improving forwarding efficiency.

As another embodiment, the obtaining the message processing operation performed by the user for the target communication message corresponding to the target area may include: obtaining a message output operation performed by the user for the target communication message corresponding to the target area.

The performing the message processing operation on the target communication message based on the association relationship between the target communication message and the message processing operation, may include: outputting the target communication message to the target user terminal in a predetermined output mode based on an association relationship between the target communication message and the message output operation, so as to enable the target user terminal to display, in a predetermined display mode corresponding to the predetermined output mode, the target communication message.

The predefined output mode is defined in the message output operation. In a case where the user selects the message output operation, an output mode predetermined by the message output operation is selected. Outputting the target communication message to the target user terminal in the predetermined output mode may refer to outputting, on the basis of adding a message reminding function, the target communication message to the target user terminal. The message reminding function is added while the target communication message is output.

The predetermined output mode may refer to the output of the target communication message added with the message reminding function. For example, a DING function is a reminding function of message output operation, which may provide various reminding functions such as online message DING, short message DING, telephone DING and the like. Message viewing may be effectively reminded through the DING function to achieve simultaneous DING reminding for multiple messages.

Figure 16:
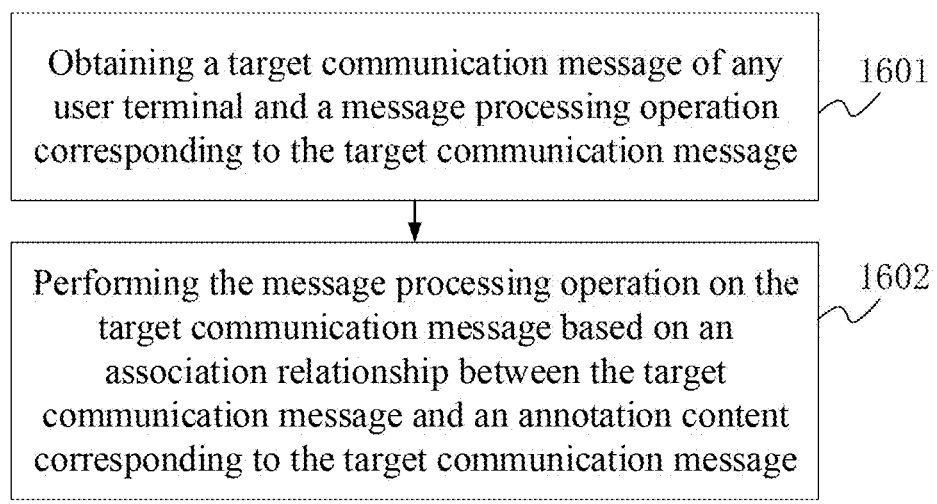
FIG. 16 is a flowchart of another embodiment of a method for processing page provided by the embodiments of the present disclosure.

FIG. 16 is a flowchart of another embodiment of a method for processing page provided by the embodiments of the present disclosure. The method may include the following steps:

At Step 1601: obtaining a target communication message of any user terminal and a message processing operation corresponding to the target communication message, The target communication message is a communication message corresponding to a target area obtained by detecting a drawing operation of a specific shape performed by a user on a display interface in a case where the user terminal displays, on the display interface, an instant messaging page including at least one communication message; and the message processing operation corresponding to the target communication message, which is performed by the user for the target communication message corresponding to the target area, is detected by the user terminal and is sent to a server terminal.

The embodiment of the present disclosure may be applied to the server terminal, and the server terminal may obtain target communication message of any user terminal and annotation content corresponding to the target communication message.

At Step 1602: performing the message processing operation on the target communication message based on an association relationship between the target communication message and annotation content corresponding to the target communication message.

In the embodiment of the present disclosure, the server terminal may obtain the target communication message sent by the user terminal and the message processing operation corresponding to the target communication message. The message processing operation, which is performed by the user for the target communication message corresponding to the target area, is detected by the user terminal to and is sent to the server terminal. The target communication message is a communication message included in the target area obtained by detecting the drawing operation of the specific shape performed by the user on the display interface in a case where the user terminal displays, on the display interface, the instant messaging page including the at least one communication message. The message selection efficiency may be improved by message selection. Thus, the server terminal may perform the message processing operation on the target communication message based on the association relationship between the target communication message and the annotation content corresponding to the target communication message. The server terminal may perform, based on the message processing operation sent by the user terminal, corresponding message processing on the target communication message, so as to quickly process the message.

As an embodiment, the message processing operation corresponding to the target communication message includes: inputting an annotation content to the target communication message.

The performing the message processing operation on the target communication message based on the association relationship between the target communication message and the annotation content corresponding to the target communication message, includes: updating and displaying the instant messaging interface based on the association relationship between the target communication message and the annotation content, to display, on the display interface, the annotation content corresponding to the target communication message.

The updated instant messaging page is sent to at least one user terminal, so as to display, on display interface of the at least one user terminal respectively, the instant messaging page including the annotation content corresponding to the target communication message.

In the embodiment of the present disclosure, the server terminal may obtain the target communication message of any user terminal and the annotation content corresponding to the target communication message. The target communication message is the communication message selected in the target area obtained by detecting the specific drawing operation performed by the user on the display interface in a case where the user terminal displays, on the display interface, the instant messaging page including the at least one communication message, and the target communication message is the message selected by the user. The annotation content corresponding to the target communication message is obtained by detecting, through the user terminal, input by the user for the target communication message corresponding to the target area. The association relationship between the target communication message and the annotation content is established, so that the instant messaging page may be updated. The updated instant messaging page is sent to the at least one user terminal, so as to display, on the display interface of the at least one user terminal respectively, the instant messaging page including the annotation content corresponding to the target communication message. By associating, by the server terminal, the target communication message and the annotation content corresponding to the target communication message, the correspondence between the message and the content is realized for multiple user terminals at the same time, so that in a case where the multiple user terminals communicate simultaneously, the instant messaging page may quickly and effectively update the annotation content and display the updated content immediately to improve the communication efficiency.

As an embodiment, the process that the server terminal obtains the target communication message of any user terminal and the annotation content corresponding to the target communication message may specifically include: determining the target area corresponding to the specific shape obtained in a case where the user performs the drawing operation of the specific shape on the display interface displaying the instant messaging page; and determining annotation content input by the user for the target communication message corresponding to the target area.

The specific steps in the embodiment of the present disclosure are the same as the steps in the embodiments as shown in FIG. 8 and FIG. 9, other than this only difference, i.e., substituting an instant messaging page for an online target document and substituting a target communication message corresponding to a specific shape selected by a user for a target content. The specific steps, implementation solutions and technical effects used in an implementation of the embodiment of the present disclosure may refer to the contents of the foregoing embodiments, which will not be described here.

As another embodiment, the message processing operation corresponding to the target communication message includes: a message forwarding operation performed for the target communication message.

The performing the message processing operation on the target communication message based on the association relationship between the target communication message and the message processing operation includes: forwarding the target communication message to a target user terminal based on an association relationship between the target communication message and the message forwarding operation, so that the target user terminal may display the target communication message.

As another embodiment, the message processing operation corresponding to the target communication message includes: a message output operation performed for the target communication message.

The performing the message processing operation on the target communication message based on the association relationship between the target communication message and the message processing operation includes: outputting, in a predetermined output mode, the target communication message to the target user terminal based on an association relationship between the target communication message and the message output operation, so as to enable the target user terminal to display, in a predetermined display mode corresponding to the predetermined output mode, the target communication message.

It should be noted that some steps in the embodiment of the present disclosure are the same as the steps in the foregoing embodiments, which will not be described here.

Figure 17:
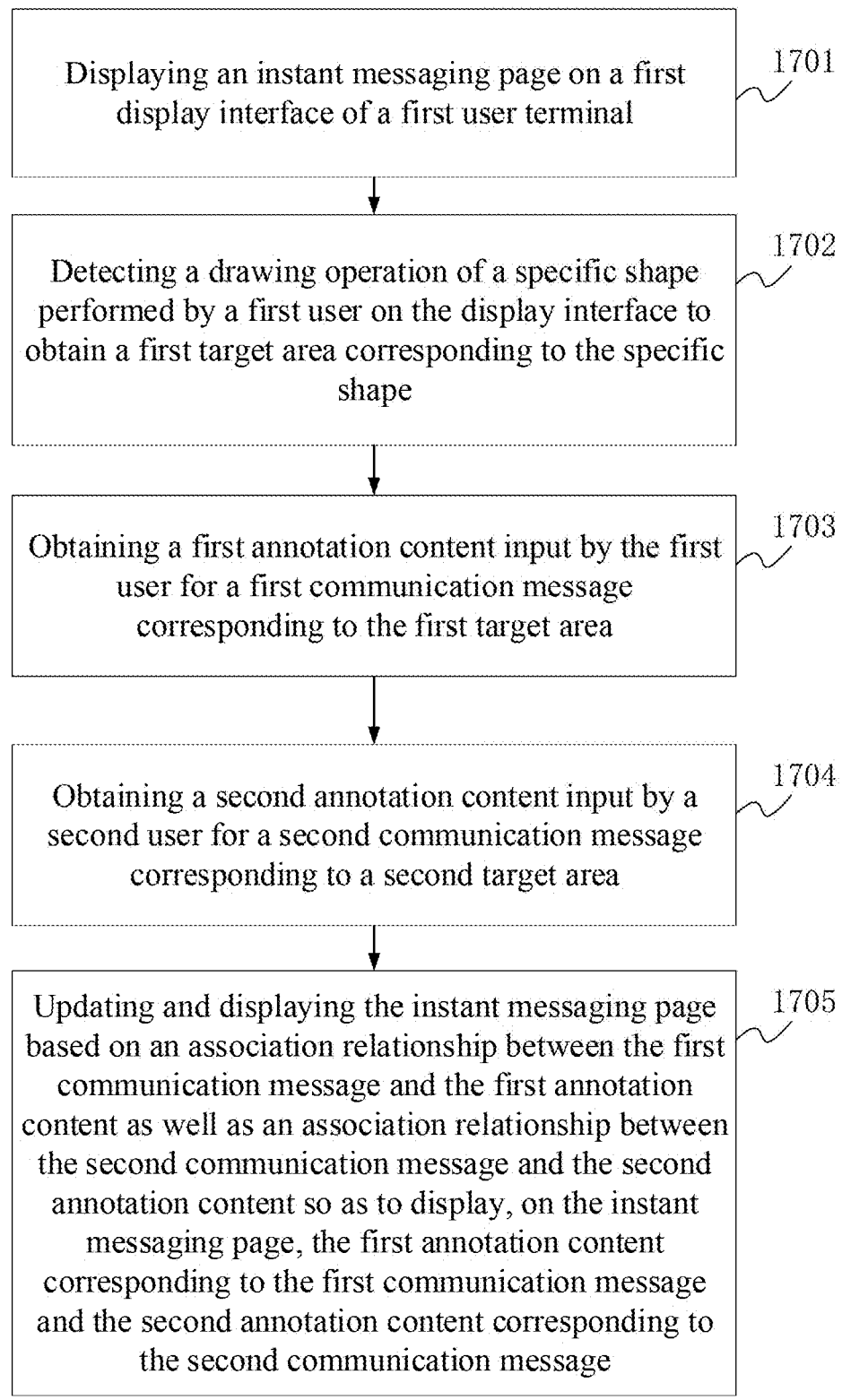
FIG. 17 is a flowchart of another embodiment of a method for processing page provided by the embodiments of the present disclosure.

FIG. 17 is a flowchart of another embodiment of a method for processing page provided by the embodiments of the present disclosure. The method may include the following steps:

At Step 1701: displaying an instant messaging page on a first display interface of a first user terminal.

The instant messaging page includes at least one communication message.

At Step 1702: detecting a drawing operation of a specific shape performed by a first user on the first display interface to obtain a first target area corresponding to the specific shape.

At Step 1703: obtaining a first annotation content input by the first user for a first communication message corresponding to the first target area.

At Step 1704: obtaining a second annotation content input by a second user for a second communication message corresponding to a second target area.

The second target area is obtained by detecting, by a second user terminal, a drawing operation of a specific shape performed by the second user for the instant messaging page displayed in a second display interface.

There may be multiple second user terminals.

At Step 1705: updating and displaying the instant messaging page, based on an association relationship between the first communication message and the first annotation content as well as an association relationship between the second communication message and the second annotation content, so as to display, on the instant messaging page, the first annotation content corresponding to the first communication message and the second annotation content corresponding to the second communication message.

The specific steps of the embodiment of the present disclosure are the same as the steps of the embodiment as shown in FIG. 12, other than this only difference, i.e., substituting an instant messaging page for an online target document and substituting a target communication message corresponding to a specific shape selected by a user for a target content. The specific steps, implementation solutions and technical effects used in an implementation of the embodiment of the present disclosure may refer to the contents of the foregoing embodiments, which will not be described here.

In the embodiment of the present disclosure, the first user terminal and the second user terminal display the instant messaging page at the same time. The first user may annotate the instant messaging page by the first user terminal. The second user may annotate the instant messaging page by the second user terminal. The first user terminal, in addition to obtain the first annotation content input by the first user for the first target communication message corresponding to the first target area, may also obtain the second annotation content input by the second user for second content corresponding to the second target area, so as to, based on the association relationship between the first annotation content and the first target communication message as well as the association relationship between the second annotation content and the second target communication message, include, in the instant messaging page displayed on the first display interface, the first annotation content associated with the first target communication message and the second annotation content associated with the second target communication message. By obtaining and displaying annotations of the user and other users, the annotation content of the instant messaging page may be simultaneously displayed by multiple user terminals, thereby improving the display efficiency.

Figure 18:
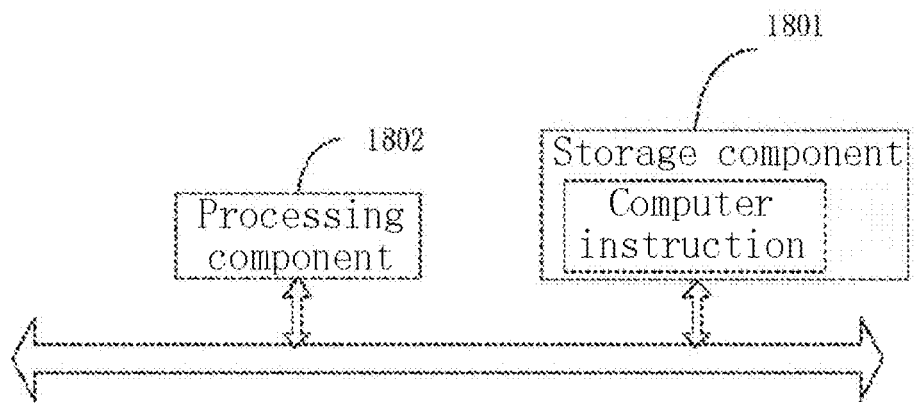
FIG. 18 is a schematic structural diagram of an embodiment of a device for processing document provided by the embodiments of the present disclosure.

FIG. 18 is a schematic structural diagram of an embodiment of a device for processing document provided by the embodiments of the present disclosure. The device may include: a storage component 1801 and a processing component 1802. The storage component 1801 is configured to store one or multiple computer instructions used to be called by the processing component 1802.

The processing component 1802 is configured to: display a target document on a display interface; detect a drawing operation of a specific shape performed by a user on the display interface to obtain a target area corresponding to the specific shape; obtain an annotation content input by the user for target content corresponding to the target area; and update and display the target document based on an association relationship between the target content and the annotation content, so that the target document displayed on the display interface includes the annotation content associated with the target content.

In the embodiment of the present disclosure, after the target document is displayed on the display interface, the drawing operation of the specific shape performed by the user on the display interface may be detected to obtain the target area corresponding to the specific shape. After the annotation content input by the user for the target content corresponding to the target area is obtained, the target document may be updated based on the association relationship between the target content and the annotation content to that the target document includes the annotation content associated with the target content. The user may rotate the target content in the target document by drawing the specific shape on the display interface. This operation mode is simpler, and a cursor is not needed to select words, one by one, which need to be selected, and the selection operation of the target content is simplified and the selection efficiency is improved, thereby improving the document annotation efficiency.

As an embodiment, the processing component may further be configured to establish, for the target document, an association relationship between the target content and the annotation content.

As another embodiment, the process that the processing component detects the drawing operation of the specific shape performed by the user on the display interface to obtain the target area corresponding to the specific shape may specifically be: detecting a drawing operation of a closed curve performed by the user on the display interface to obtain a target area corresponding to the closed curve.

In some embodiments, the process that the processing component detects the drawing operation of the closed curve performed by the user on the display interface to obtain the target area corresponding to the closed curve may specifically be: obtaining a curve drawn by the user performing the drawing operation on the display interface; if the curve is a closed curve, then obtaining a target area corresponding to the closed curve.

As a possible implementation, the process that if the curve is the closed curve the processing component obtains the target area corresponding to the closed curve, may specifically be: dividing a curve, generated in a case where the user performs a line drawing operation, into at least one line segment; determining drawing direction corresponding to the at least one line segment respectively; if there are two line segments that are drawn in opposite directions and satisfy a parallel condition, then determining that the curve is a closed curve; and obtaining the target area corresponding to the closed curve.

As another possible implementation, the process that if the curve is the closed curve, the processing component obtains the target area corresponding to the closed curve may specifically be: if the shape of the curve is an ellipse or a rectangle, then determining that the curve is a closed curve; and obtaining the target area corresponding to the closed curve.

As another possible implementation, the process that if the curve is the closed curve, the processing component obtains the target area corresponding to the closed curve may specifically be: if the curve is the closed curve, then obtaining an area, where at least one word enclosed by the closed curve is located, as the target area.

As an embodiment, the process that the processing component detects the drawing operation of the specific shape performed by the user on the display interface to obtain the target area corresponding to the specific shape, may specifically be: detecting a drawing operation of a non-closed curve performed by the user on the display interface to obtain a target area corresponding to the non-closed curve.

In some embodiments, the process that the processing component detects the drawing operation of the non-closed curve performed by the user on the display interface to obtain the target area corresponding to the non-closed curve, may specifically be: obtaining a curve drawn by the user performing a drawing operation on the display interface; if the curve is a non-closed curve, then obtaining a target area corresponding to the non-closed curve.

As a possible implementation, the process that if the curve is the non-closed curve, the processing component obtains the target area corresponding to the non-closed curve, may specifically be: dividing a curve, generated in a case where the user performs a line drawing operation, into at least one line segment; determining drawing direction corresponding to the at least one line segment respectively; if the drawing directions of the at least one line segment are all same, then determining that the curve is a non-closed curve; and obtaining a target area corresponding to the non-closed curve.

As another possible implementation, the process that if the curve is the non-closed curve, the processing component obtains the target area corresponding to the non-closed curve, may specifically be: if the curve is a straight line and/or a wavy line, then determining that the curve is a non-closed curve; and obtaining a target area corresponding to the non-closed curve.

As another possible implementation, the process that if the curve is the non-closed curve, the processing component obtains the target area corresponding to the non-closed curve, may specifically be: if the curve is a non-closed curve, then determining a text height of the target document displayed on the display interface; and determining a target area according to an area formed by the text height and a straight-line distance of the non-closed curve.

In some embodiments, the processing component may further be configured to: store, for the target document, the target content and the annotation content which is associated with the target content.

In some embodiments, the processing component may further be configured to: share, in response to a sharing request of the user, a page link corresponding to the updated target document to a user to be receiving the sharing.

In a possible implementation, the process that the processing component shares, in response to the sharing request of the user, the page link corresponding to the updated target document to the user to be receiving the sharing, may specifically be: in response to a sharing request of the user, generating a page link corresponding to the updated target document; displaying a sharing page including at least one user to be receiving the sharing, so as to enable the user to select a user to be receiving the sharing from the sharing page; and sending the page link to the user to be receiving the sharing.

In another possible implementation, the processing component may further be configured to: obtain a document viewing request triggered by the user receiving the sharing for the page link, and outputting the corresponding target document including the target content and the annotation content associated with the target content for the user receiving the sharing.

As another embodiment, the process that the processing component shares, in response to the sharing request of the user, the page link corresponding to the updated target document to the user to be receiving the sharing, may specifically be: sending, in response to the sharing request of the user, a link sharing request to a server terminal, so as to enable the server terminal to generate, in response to the link sharing request, a page link corresponding to the updated target document; displaying a sharing page including at least one user to be receiving the sharing, so as to enable the user to select a user to be receiving the sharing from the sharing page; and sending, to the server terminal, a user to be receiving the sharing selected by the user, so as to enable the server terminal to send the page link to the user to be receiving the sharing.

In some embodiments, the processing component may further be configured to: send, to a server, the stored target document which includes the target content and the annotation content associated with the target content, so that the server may detect a document viewing request triggered by a user receiving a sharing and output, to the user receiving the sharing, the corresponding target document including the target content and the annotation content associated with the target content.

As an embodiment, the process that the processing component obtains the annotation content input by the user for the target content corresponding to the target area, may specifically be: displaying an annotation input sub-page for the target content corresponding to the target area on the display interface; and obtaining an annotation content input by the user on the annotation input sub-page.

In a possible design, the process that the processing component obtains the annotation content input by the user on the annotation input sub-page, may specifically be: detecting a target text input by the user in a text input control of the annotation input sub-page; and determining that the target text is the annotation content.

In another possible implementation, the process that the processing component obtains the annotation content input by the user on the annotation input sub-page, may specifically be: detecting a triggering operation of the user for a voice input control on the annotation input sub-page, and switching to a voice collection state to collect a voice signal sent by the user; and determining the annotation content according to the voice signal.

As an embodiment, the processing component may further be configured to: determine the target content corresponding to the target area according to at least one word enclosed by the target area.

In a possible implementation, the process that the processing component determines the target content corresponding to the target area according to the at least one word enclosed by the target area, may specifically be: determining whether the at least one word enclosed by the target area satisfies a sentence composition condition; if the sentence composition condition is satisfied, determining that a complete sentence in which the at least one word is located is the target content; and if the sentence composition condition is not satisfied, determining that the at least one word is the target content.

Further, optionally, the process that the processing component determines whether the at least one word enclosed by the target area satisfies the sentence composition condition, may specifically be: performing semantic analysis processing on the position and meaning of the at least one word enclosed by the target area in the target document to determine whether the at least one word satisfies the sentence composition condition or not.

As an embodiment, the process that the processing component displays the target document on the display interface, may specifically be: obtaining historical target content of the target document and the annotation content associated with the historical target content; generating a display page of the target document including the annotation content associated with the historical target content according to a display parameter of the display interface and a typesetting rule of the target document; and displaying the display page of the target document on the display interface.

Further, optionally, the processing component may further be configured to update the display page of the target document including the annotation content corresponding to the target content according to the display parameter of the display interface and the typesetting rule of the target document.

As an embodiment, the processing component may further be configured to send the target area to a server terminal, so as to enable the server terminal to determine the target area and the target content corresponding to the target area on the display interface.

After obtaining the annotation content input by the user for the target content corresponding to the target area, the process further includes: sending the annotation content of the target content to the server terminal, so as to enable the server terminal to establish an association relationship between the target content and the annotation content, and to update and store the target document based on the association relationship between the target content and the annotation content so that the target document includes the annotation content associated with the target content.

As an embodiment, the process that the processing component detects the drawing operation of the specific shape performed by the user on the display interface to obtain the target area corresponding to the specific shape, may specifically be: detecting the drawing operation of the specific shape performed by the user on the display interface to obtain a curve corresponding to the specific shape; sending the curve to the server terminal, so as to enable the server terminal to obtain the target area according to the obtained curve and to send the target area to the user terminal; and receiving the target area sent by the server terminal.

As another embodiment, the updating and displaying the target document based on the association relationship between the target content and the annotation content so that the target document on the display interface includes the annotation content associated with the target content, may include: establishing a connection line for the target area and the annotation content associated with the target content; and displaying, on the display interface, based on the association relationship between the target content and the annotation content, the target document corresponding to the target area and the annotation content associated with the target content which are connected using the connection line.

Figure 19:
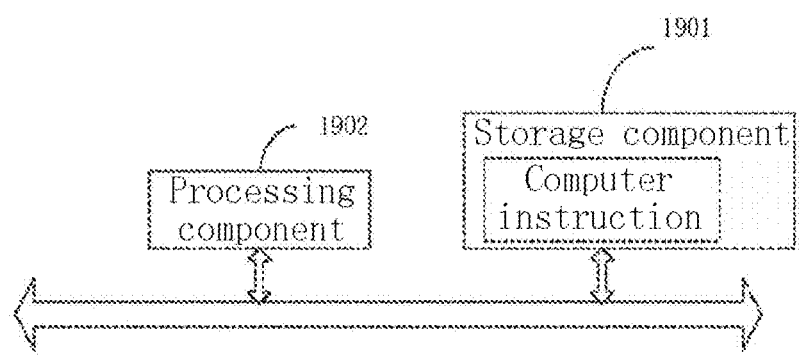
FIG. 19 is a schematic structural diagram of another embodiment of a device for processing document provided by the embodiments of the present disclosure.

FIG. 19 is a schematic structural diagram of another embodiment of a device for processing document provided by the embodiments of the present disclosure. The device may include: a storage component 1901 and a processing component 1902. The storage component 1901 is configured to store one or multiple computer instructions used to be called by the processing component 1902.

The processing component 1902 is configured to: determining a target area corresponding to a specific shape obtained in a case where a user performs a drawing operation of a specific shape on a display interface for displaying a target document; determining annotation content input by the user for target content corresponding to the target area; and updating and storing the target document based on an association relationship between the target content and the annotation content so that the target document includes the annotation content associated with the target content.

In the embodiment of the present disclosure, a server terminal may determine the target area corresponding to the specific shape obtained in a case where the user performs the drawing operation of the specific shape on the display interface for displaying the target document. Thus, after the user inputs the annotation content for the target content corresponding to the target area, the server terminal may update and store, according to the target content corresponding to the target area, the target document based on the association relationship between the target content and the annotation content, so that the target document includes the annotation content associated with the target content. By establishing the association relationship between the target content and the annotation content, the annotation content may be accurately positioned to quickly establish annotation for the target document.

As an embodiment, the processing component may further be configured to send the updated target content to the user terminal, so that the user terminal updates and displays the target document including the annotation content associated with the target content based on the association relationship between the target content and the annotation content.

As another embodiment, the processing component may further be configured to detect a document viewing request triggered by a user receiving a sharing for a page link of the target document, and send the updated target document to a user terminal of the user receiving the sharing, so that the user terminal outputs the corresponding target document including the target content and the annotation content associated with the target content.

In some embodiments, the processing component may further be configured to receive a link sharing request sent by the user terminal; generate a page link corresponding to the updated target document in response to the link sharing request; and receive a user to be receiving a sharing sent by the user terminal, so as to send the page link to the user to be receiving the sharing.

As an embodiment, the process that the processing component determines the target area corresponding to the specific shape obtained in a case where the user performs the drawing operation of the specific shape on the display interface for displaying the target document, may specifically be: receiving the target area, sent by the user terminal of the user, corresponding to the specific shape obtained in a case where the user performs the drawing operation of the specific shape on the display interface for displaying the target document.

As another embodiment, the process that the processing component determines the target area corresponding to the specific shape obtained in a case where the user performs the drawing operation of the specific shape on the display interface for displaying the target document, may specifically be: determining a curve, sent by a user terminal, obtained in a case where the user performs the drawing operation of the specific shape on the display interface; and obtaining the target area according to the curve.

In some embodiments, the process that the processing component obtains the target area according to the curve, may specifically be: if the curve is a closed curve, then obtaining a target area corresponding to the closed curve.

As a possible implementation, the process that the processing component obtains the target area corresponding to the closed curve if the curve is the closed curve, may specifically be: dividing a curve, generated in a case where the user performs a line drawing operation, into at least one line segment; determining drawing direction corresponding to the at least one line segment respectively; if there are two line segments that are drawn in opposite directions and satisfy a parallel condition, then determining that the curve is a closed curve; and obtaining the target area corresponding to the closed curve.

As another possible implementation, the process that the processing component obtains the target area corresponding to the closed curve if the curve is the closed curve, may specifically be: if the shape of the curve is an ellipse or a rectangle, then determining that the curve is a closed curve; and obtaining the target area corresponding to the closed curve.

As another embodiment, the process that the processing component obtains the target area corresponding to the closed curve if the curve is the closed curve, may specifically be: if the curve is a closed curve, then obtaining an area, in which at least one word enclosed by the closed curve is located, as the target area.

In some embodiments, the process that the processing component obtains the target area according to the curve, may specifically be: if the curve is a non-closed curve, then obtaining a target area corresponding to the non-closed curve.

As a possible implementation, the process that the processing component obtains the target area corresponding to the non-closed curve if the curve is the non-closed curve, may specifically be: dividing a curve, generated in a case where the user performs a line drawing operation, into at least one line segment; determining drawing direction corresponding to the at least one line segment respectively; if the drawing directions of the at least one line segment are all same, determining that the curve is a non-closed curve; and obtaining the target area corresponding to the non-closed curve.

As another possible implementation, the process that the processing component obtains the target area corresponding to the non-closed curve if the curve is the non-closed curve, may specifically be: if the curve is a straight line and/or a wavy line, determining that the curve is a non-closed curve; and obtaining the target area corresponding to the non-closed curve.

As another possible implementation, the process that the processing component obtains the target area corresponding to the non-closed curve if the curve is the non-closed curve, may specifically be: if the curve is a non-closed curve, determining a text height of the target document displayed on the display interface; and determining the target area according to an area formed by the text height and a straight-line distance of the non-closed curve.

Figure 20:
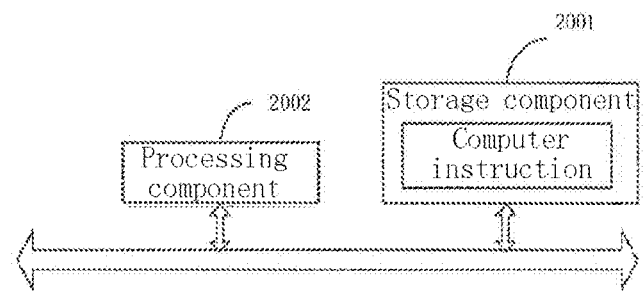
FIG. 20 is a schematic structural diagram of another embodiment of a device for processing document provided by the embodiments of the present disclosure.

FIG. 20 is a schematic structural diagram of another embodiment of a device for processing document provided by the embodiments of the present disclosure. The device may include: a storage component 2001 and a processing component 2002. The storage component is configured to store one or multiple computer instructions used to be called by the processing component 2002.

The processing component 2002 is configured to: display a target document on a first display interface of a first user terminal; detect a drawing operation of a specific shape performed by a first user on the first display interface to obtain a first target area corresponding to the specific shape; obtain a first annotation content input by the first user for a first target content corresponding to the first target area; obtain a second annotation content input by a second user for a second target content corresponding to a second target area, wherein the second target area is obtained by detecting, by a second user terminal, a drawing operation of a specific shape performed by the second user for the target document displayed on a second display interface; and update and display, based on an association relationship between the first target content and the first annotation content as well as an association relationship between the second target content and the second annotation content, the target document, so that the target document displayed on the first display interface includes the first annotation content associated with the first target content and the second annotation content associated with the second target content.

In the embodiment of the present disclosure, the first user may annotate the target document by the first user terminal; the second user may annotate the target document by the second user terminal; and the first user terminal, in addition to obtain the first annotation content input by the first user for the first target content corresponding to the first target area, may also obtain the second annotation content input by the second user for the second content corresponding to the second target area, so that, based on the association relationship between the first annotation content and the first target content as well as the association relationship between the second annotation content and the second target content, the target document displayed on the first display interface includes the first annotation content associated with the first target content and the second annotation content associated with the second target content. By obtaining and displaying annotations of the user and other users, the annotation content of the target document may be simultaneously displayed by multiple user terminals, thereby improving the display efficiency.

Figure 21:
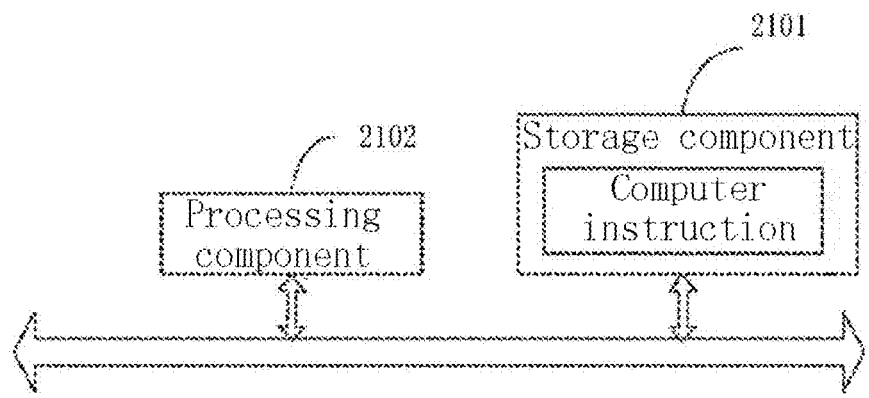
FIG. 21 is a schematic structural diagram of an embodiment of a device for processing page provided by the embodiments of the present disclosure.

FIG. 21 is a schematic structural diagram of an embodiment of a device for processing page provided by the embodiments of the present disclosure. The device may include: a storage component 2101 and a processing component 2102. The storage component 2101 is configured to store one or multiple computer instructions used to be called by the processing component 2102.

The processing component 2102 is configured to: display an instant messaging page on a display interface, wherein the instant messaging page includes at least one communication message; detect a drawing operation of a specific shape performed by a user on the display interface to obtain a target area corresponding to the specific shape; obtain a message processing operation performed by the user for a target communication message corresponding to the target area; and perform the message processing operation on the target communication message based on an association relationship between the target communication message and the message processing operation.

In the embodiment of the present disclosure, a user terminal may display the instant messaging page on the display interface. The instant messaging page may include at least one communication message. The user may view an instant messaging interface displayed on the display interface and trigger, in the instant messaging interface, the drawing operation of the specific shape for the instant messaging page displayed on the display interface to obtain the target area corresponding to the specific shape. An instant communication message that needs to be annotated may be simply selected by drawing on the page, and at this time, the message processing operation performed by the user for the target communication message corresponding to the target area may be obtained. Thus, the corresponding message processing operation may be performed based on the association relationship between the target communication message and the message processing operation corresponding to the target communication message. The communication messages on the instant messaging page may be quickly selected through simple options to quickly process the messages, for example, to perform message reply or annotation, so as to improve message processing efficiency.

As an embodiment, the processing component may further be configured to: determining the target communication message corresponding to the target area in the at least one communication message of the instant messaging page.

The target communication message may refer to a communication message in the instant messaging page in the target area. As a possible implementation, the communication message enclosed in the target area selected by the user may be detected.

As a possible implementation, the process that the processing component obtains the message processing operation performed by the user for the target communication message corresponding to the target area, may specifically be: obtaining an annotation content input by the user for the target communication message corresponding to the target area.

The process that the processing component performs the message processing operation on the target communication message based on the association relationship between the target communication message and the message processing operation, may specifically be: updating and displaying an instant messaging interface based on an association relationship between the target communication message and the annotation content to display, on the display interface, the annotation content corresponding to the target communication message.

As another possible implementation, the process that the processing component obtains the message processing operation performed by the user for the target communication message corresponding to the target area, may specifically be: obtaining a message forwarding operation performed by the user for the target communication message corresponding to the target area.

The process that the processing component performs the message processing operation on the target communication message based on the association relationship between the target communication message and the message processing operation, may specifically be: forwarding the target communication message to a target user terminal based on an association relationship between the target communication message and the message forwarding operation, so that the target user terminal displays the target communication message.

As another possible implementation, the process that the processing component obtains the message processing operation performed by the user for the target communication message corresponding to the target area, may specifically be: obtaining a message output operation performed by the user for the target communication message corresponding to the target area.

The process that the processing component performs the message processing operation on the target communication message based on the association relationship between the target communication message and a message prompt operation, may specifically be: outputting the target communication message to a target user terminal in a predetermined output mode based on an association relationship between the target communication message and the message output operation, so as to enable the target user terminal to display, in a predetermined display mode corresponding to the predetermined output mode, the target communication message.

Figure 22:
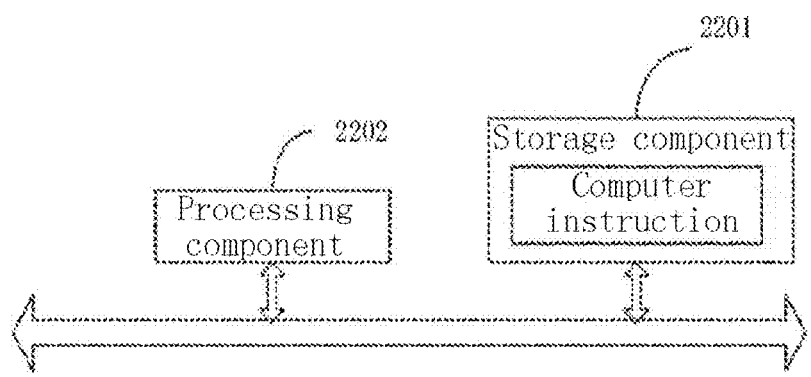
FIG. 22 is a schematic structural diagram of another embodiment of a device for processing page provided by the embodiments of the present disclosure.

FIG. 22 is a schematic structural diagram of another embodiment of a device for processing page provided by the embodiments of the present disclosure. The device includes: a storage component 2201 and a processing component 2202. The storage component 2201 is configured to store one or multiple computer instructions used to be called by the processing component 2202.

The processing component 2202 is configured to: obtain a target communication message of any user terminal and a message processing operation corresponding to the target communication message, wherein the target communication message is a communication message corresponding to a target area obtained by detecting a drawing operation of a specific shape performed by a user on a display interface in a case where the user terminal displays, on the display interface, an instant messaging page including at least one communication message; and the message processing operation corresponding to the target communication message, which is performed by the user for the target communication message corresponding to the target area, is detected by the user terminal and is sent to a server terminal; and perform the message processing operation on the target communication message based on an association relationship between the target communication message and an annotation content corresponding to the target communication message.

As an embodiment, the message processing operation corresponding to the target communication message may include: inputting an annotation content to the target communication message.

The process that the processing component performs the message processing operation on the target communication message based on the association relationship between the target communication message and the annotation content corresponding to the target communication message, may specifically be: updating and displaying an instant messaging page based on the association relationship between the target communication message and the annotation content to display, on the display interface, the annotation content corresponding to the target communication message; and sending the updated instant messaging page to at least one user terminal, so as to display, on display interface of the at least one user terminal respectively, the instant messaging page including the annotation content corresponding to the target communication message.

As another embodiment, the message processing operation corresponding to the target communication message includes: a message forwarding operation performed for the target communication message.

The process that the processing component performs the message processing operation on the target communication message based on the association relationship between the target communication message and the message processing operation, may specifically be: forwarding the target communication message to a target user terminal based on an association relationship between the target communication message and the message forwarding operation, so that the target user terminal displays the target communication message.

As another embodiment, the message processing operation corresponding to the target communication message includes: a message output operation performed for the target communication message.

The process that the processing component performs the message processing operation on the target communication message based on the association relationship between the target communication message and the message processing operation, may specifically be: outputting, in a predetermined output mode, the target communication message to the target user terminal based on an association relationship between the target communication message and the message output operation, so as to enable the target user terminal to display, in a predetermined display mode corresponding to the predetermined output mode, the target communication message.

Figure 23:
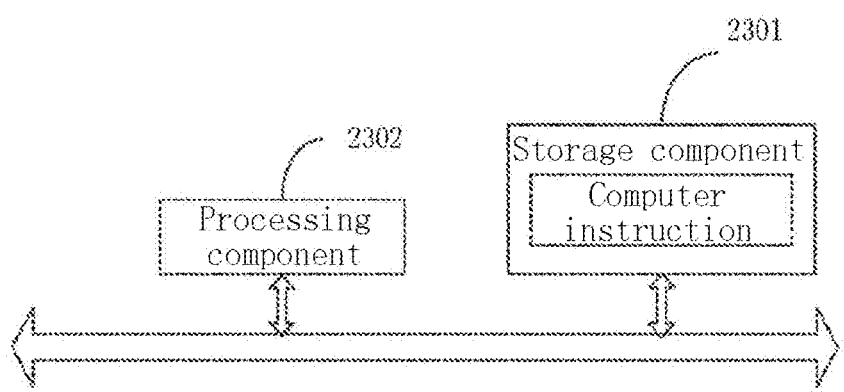
FIG. 23 is a schematic structural diagram of another embodiment of a device for processing page provided by the embodiments of the present disclosure.

FIG. 23 is a schematic structural diagram of another embodiment of a device for processing page provided by the embodiments of the present disclosure. The device includes: a storage component 2301 and a processing component 2302. The storage component 2301 is configured to store one or multiple computer instructions used to be called by the processing component 2302.

The processing component 2302 is configured to: display an instant messaging page in a first display interface of a first user terminal, wherein the instant messaging page includes at least one communication message; detect a drawing operation of a specific shape performed by a first user on the display interface to obtain a first target area corresponding to the specific shape; obtain a first annotation content input by the first user for a first communication message corresponding to the first target area; obtain a second annotation content input by a second user for a second communication message corresponding to a second target area, wherein the second target area is obtained by detecting, by a second user terminal, a drawing operation of a specific shape performed by the second user for the instant messaging page displayed in a second display interface; and update and display, based on an association relationship between the first communication message and the first annotation content as well as an association relationship between the second communication message and the second annotation content, the instant messaging page so as to display, on the instant messaging page, the first annotation content corresponding to the first communication message and the second annotation content corresponding to the second communication message.

In the embodiment of the present disclosure, a server terminal may obtain the target communication message of any user terminal and the annotation content corresponding to the target communication message. The target communication message is the communication message selected in the target area obtained by detecting the specific drawing operation performed by the user on the display interface in a case where the user terminal displays, on the display interface, the instant messaging page including the at least one communication message, and the target communication message is the message selected by the user. The annotation content corresponding to the target communication message is obtained by detecting, through the user terminal, input by the user for the target communication message corresponding to the target area. The association relationship between the target communication message and the annotation content is established, so that the instant messaging page may be updated. The updated instant messaging page is sent to at least one user terminal, so as to display, on the display interface of the at least one user terminal respectively, the instant messaging page including the annotation content corresponding to the target communication message. By associating, by the server terminal, the target communication message and the annotation content corresponding to the target communication message, the correspondence between the message and the content is realized for multiple user terminals at the same time, so that in a case where the multiple user terminals communicate simultaneously, the instant messaging page may quickly and effectively update annotation content and display the updated content immediately to improve the communication efficiency.

The parts that are not described in detail in the embodiments may refer to the related descriptions of the embodiments as shown in FIGS. 1-5, FIGS. 7-8, and FIGS. 11-12.

The executive processes and technical effects of the technical solution refer to the descriptions in the embodiments as shown in FIGS. 1-5, FIGS. 7-8, and FIGS. 11-12, which will not be described here.

The embodiments of the device described above are only schematic, wherein the units described as separate components may or may not be physically separated, and the components displayed as the units may or may not be physical units, that is, they may be located in a place or distributed on multiple network units. Some or all of modules may be selected according to actual needs to achieve the objectives of the solutions of the embodiments. A person having ordinary skill in the art may understand and implement the embodiments without creative efforts.

From the description of the above embodiments, a person having ordinary skill in the art may clearly understand that each implementation may be achieved by adding a necessary general hardware platform, and certainly may also be achieved by combining hardware and software. Based on this understanding, the above-mentioned technical solution substantially or the part that makes contributions to the existing art may be embodied in the form of computer products. The present disclosure may take the form of computer program products implemented on one or multiple computer-usable storage media (including, but not limited to, a disk memory, a compact disc read-only memory (CD-ROM), an optical memory and the like) having computer-usable program codes therein.

The present disclosure is described with reference to the flowcharts and/or block diagrams of a method, device (system), and computer program product according to the embodiments of the present disclosure. It should be understood that each flow and/or block in the flowchart and/or block diagram, and combinations of the flows and/or blocks in the flowchart and/or block diagram may be implemented by computer program instructions. These computer program instructions may be provided to a processor of a general-purpose computer, a special-purpose computer, an embedded processor or other programmable data processing device to produce a machine, so that the instructions executed by the processor of the computer or the other programmable data processing device produce an apparatus for implementing the functions specified in one or multiple flows in the flowchart and/or one or multiple blocks in the block diagram.

These computer program instructions may also be stored in a computer-readable memory capable of guiding a computer or other programmable data processing device to function in a particular manner, so that the instructions stored in the computer-readable memory produces a manufactured product including an instruction apparatus. The instruction apparatus implements the functions specified in one or multiple flows in the flowchart and/or one or multiple blocks in the block diagram.

These computer program instructions may also be loaded on a computer or other programmable data processing device to cause a series of operation steps to be performed on the computer or other programmable device to produce a computer-implemented process, so that the instructions executed on the computer or other programmable device provide the steps for implementing the functions specified in one or multiple flows in the flowchart and/or one or multiple blocks in the block diagram.

In a typical configuration, a computing device includes one or multiple central processing units (CPUs), an input/output interface, a network interface and a memory.

The memory may include different forms of memory, such as a volatile memory, a random access memory (RAM) and/or a non-volatile memory such as a read only memory (ROM) or a flash random access memory (flash RAM) in computer-readable media. The memory is an example of the computer-readable media.

The computer-readable media include non-volatile and volatile media as well as removable and non-removable media, which may store information by any way or technology. The information may be computer-readable instructions, data structures, program modules or other data. Examples of the storage media of the computer include, but are not limited to, a phase-change random access memory (PRAM), a static random access memory (SRAM), a dynamic random access memory (DRAM), other types of random access memories (RAMs), a read only memory (ROM), an electrically erasable programmable read only memory (EEPROM), a flash memory or other memory technologies, a compact disc read only memory (CD-ROM), a digital versatile disc (DVD) or other optical memories, a magnetic tape cassette, and magnetic tape and magnetic disk memories, other magnetic storage devices or any other non-transmission medium that can be used to store information accessible for the computing device. As defined herein, the computer-readable media do not include transitory computer-readable media, such as modulated data signals and carrier waves.

Finally, it should be noted that the above embodiments are only used to describe the technical solutions of the present disclosure, but not to limit them. Although the present disclosure has been described in detail with reference to the foregoing embodiments, people having ordinary skill in the art should understand that: they may still modify the technical solutions described in the foregoing embodiments, or equivalently substitute some technical features therein. These modifications or substitutions do not make the essence of the corresponding technical solutions deviate from the spirit and scope of the technical solutions of the embodiments of the present disclosure.

What is claimed is:

1. A method for processing document, comprising:
displaying a target document on a display interface;
detecting a drawing operation of a specific shape performed by a user on the display interface, to obtain a target area corresponding to the specific shape;
obtaining an annotation content input by the user for a target content corresponding to the target area; and
updating and displaying the target document based on an association relationship between the target content and the annotation content, so that the target document displayed on the display interface includes the annotation content associated with the target content;
wherein before obtaining the annotation content input by the user for the target content corresponding to the target area, the method further comprises:
determining the target content corresponding to the target area according to at least one word enclosed by the target area;
wherein the determining the target content corresponding to the target area according to the at least one word enclosed by the target area, comprises:
determining whether the at least one word enclosed by the target area satisfies a sentence composition condition;
if the sentence composition condition is satisfied, determining that a complete sentence, in which the at least one word is located, is the target content; and if the sentence composition condition is not satisfied, determining that the at least one word is the target content.

2. The method of claim 1, wherein the detecting the drawing operation of the specific shape performed by the user on the display interface, to obtain the target area corresponding to the specific shape, comprises:
detecting a drawing operation of a closed curve performed by the user on the display interface to obtain a target area corresponding to the closed curve.

3. The method of claim 1, wherein the detecting the drawing operation of the specific shape performed by the user on the display interface, to obtain the target area corresponding to the specific shape, comprises:
detecting a drawing operation of a non-closed curve performed by the user on the display interface to, obtain a target area corresponding to the non-closed curve.

4. The method of claim 3, wherein the obtaining the target area corresponding to the non-closed curve if the curve is the non-closed curve, comprises:
determining a text height of the target document displayed on the display interface if the curve is the non-closed curve; and
determining the target area according to an area formed by the text height and a straight-line distance of the non-closed curve.

5. The method of claim 1, further comprising:
sharing, in response to a sharing request of the user, a page link corresponding to the updated target document to a user to be receiving a sharing.

6. The method of claim 5, further comprising:
obtaining a document viewing request triggered, for the page link, by the user to be receiving the sharing, and outputting, for the user to be receiving the sharing, the corresponding target document including the target content and the annotation content associated with the target content.

7. The method of claim 6, further comprising:
sending, to a server, the target document, which has been stored, including the target content and the annotation content associated with the target content, so as to enable the server to output, for the user to be receiving the sharing, the corresponding target document including the target content and the annotation content associated with the target content in a case where a document viewing request triggered by the user to be receiving the sharing is detected by the server.

8. The method of claim 1, wherein the obtaining the annotation content input by the user for the target content corresponding to the target area, comprises:
displaying, on the display interface, an annotation input sub-page for the target content corresponding to the target area; and
obtaining the annotation content input by the user on the annotation input sub-page.

9. The method of claim 8, wherein the obtaining the annotation content input by the user on the annotation input sub-page, comprises:
detecting a target text input by the user in a text input control of the annotation input sub-page; and
determining that the target text is the annotation content, wherein the obtaining the annotation content input by the user on the annotation input sub-page, comprises:
detecting a triggering operation of the user for a voice input control on the annotation input sub-page, and switching to a voice collection state to collect a voice signal sent by the user; and
determining the annotation content according to the voice signal.

10. The method of claim 1, wherein the displaying the target document on the display interface, comprises:
obtaining a historical target content of the target document and an annotation content associated with the historical target content;
generating a display page of the target document including the annotation content associated with the historical target content according to a display parameter of the display interface and a typesetting rule of the target document; and
displaying the display page of the target document on the display interface.

11. The method of claim 10, wherein after updating the target document based on the association relationship between the target content and the annotation content so that the target document includes the annotation content associated with the target content, the method further comprises:
updating the display page of the target document including the annotation content corresponding to the target content according to the display parameter of the display interface and the typesetting rule of the target document.

12. The method of claim 1, wherein after detecting the drawing operation of the specific shape performed by the user on the display interface to obtain the target area corresponding to the specific shape, the method further comprises:
sending the target area to a server terminal, so as to enable the server terminal to determine the target area and the target content corresponding to the target area on the display interface; and
after obtaining the annotation content input by the user for the target content corresponding to the target area, the method further comprises:
sending the annotation content of the target content to the server terminal, so as to enable the server terminal to establish the association relationship between the target content and the annotation content and to update and store the target document based on the association relationship between the target content and the annotation content so that the target document includes the annotation content associated with the target content.

13. The method of claim 1, wherein the updating and displaying the target document based on the association relationship between the target content and the annotation content, so that the target document of the display interface includes the annotation content associated with the target content, comprises:
establishing a connection line for the target area and the annotation content associated with the target content; and
displaying, on the display interface, based on the association relationship between the target content and the annotation content, the target document corresponding to the target area and the annotation content associated with the target content which are connected using the connection line.

14. A method for processing page, comprising:
displaying an instant messaging page on a display interface, wherein the instant messaging page includes at least one communication message;
detecting a drawing operation of a specific shape performed by a user on the display interface, to obtain a target area corresponding to the specific shape;

obtaining a message processing operation performed by the user for a target communication message corresponding to the target area; and performing the message processing operation on the target communication message based on an association relationship between the target communication message and the message processing operation;

wherein before obtaining the message processing operation performed by the user for the target communication message corresponding to the target area, the method further comprises:

determining the target communication message corresponding to the target area according to at least one word enclosed by the target area;

wherein the determining the target communication message corresponding to the target area according to the at least one word enclosed by the target area, comprises:

determining whether the at least one word enclosed by the target area satisfies a sentence composition condition;

if the sentence composition condition is satisfied, determining that a complete sentence, in which the at least one word is located, is the target communication message; and if the sentence composition condition is not satisfied, determining that the at least one word is the target communication message.

15. The method of claim 14, wherein the obtaining the message processing operation performed by the user for the target communication message corresponding to the target area, comprises:

obtaining an annotation content input by the user for the target communication message corresponding to the target area; and the performing the message processing operation on the target communication message based on the association relationship between the target communication message and the message processing operation, comprises:

updating and displaying the instant messaging page based on an association relationship between the target communication message and the annotation content, so as to display, on the display interface, the annotation content corresponding to the target communication message displayed.

16. A device for processing page, comprising: a storage component and a processing component, wherein the storage component is configured to store one or more computer instructions used to be called by the processing component; and the processing component is configured to:

display an instant messaging page on a display interface, wherein the instant messaging page includes at least one communication message; detect a drawing operation of a specific shape performed by a user on the display interface to obtain a target area corresponding to the specific shape; obtain a message processing operation performed by the user for a target communication message corresponding to the target area; and performing the message processing operation on the target communication message based on an association relationship between the target communication message and the message processing operation;

wherein the processing component is further configured to: before obtain the message processing operation performed by the user for the target communication message corresponding to the target area, determine the target communication message corresponding to the target area according to at least one word enclosed by the target area;

wherein the processing component is further configured to:

determine whether the at least one word enclosed by the target area satisfies a sentence composition condition;

if the sentence composition condition is satisfied, determining that a complete sentence, in which the at least one word is located, is the target communication message; and if the sentence composition condition is not satisfied, determining that the at least one word is the target communication message.

17. The method of claim 6, wherein the detecting the drawing operation of the specific shape performed by the user on the display interface, to obtain the target area corresponding to the specific shape, comprises:

detecting a drawing operation of a closed curve performed by the user on the display interface to obtain a target area corresponding to the closed curve.

18. The method of claim 6, wherein the detecting the drawing operation of the specific shape performed by the user on the display interface, to obtain the target area corresponding to the specific shape, comprises:

detecting a drawing operation of a non-closed curve performed by the user on the display interface to, obtain a target area corresponding to the non-closed curve.

* * * * *